(12) United States Patent
Miyazaki et al.

(10) Patent No.: US 9,207,477 B2
(45) Date of Patent: Dec. 8, 2015

(54) DISPLAY MODULE AND DISPLAY DEVICE

(75) Inventors: Hiroki Miyazaki, Osaka (JP); Motoji Shiota, Osaka (JP); Takatoshi Kira, Osaka (JP); Gen Nagaoka, Osaka (JP); Seiji Muraoka, Osaka (JP); Makoto Tamaki, Osaka (JP); Keiji Aota, Osaka (JP); Yukio Shimizu, Osaka (JP); Takashi Matsui, Osaka (JP); Hiroki Nakahama, Osaka (JP); Hiroki Makino, Osaka (JP); Minoru Horino, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 158 days.

(21) Appl. No.: 14/113,886

(22) PCT Filed: Apr. 23, 2012

(86) PCT No.: PCT/JP2012/060822
§ 371 (c)(1),
(2), (4) Date: Nov. 25, 2013

(87) PCT Pub. No.: WO2012/147672
PCT Pub. Date: Nov. 1, 2012

(65) Prior Publication Data
US 2014/0092338 A1 Apr. 3, 2014

(30) Foreign Application Priority Data
Apr. 28, 2011 (JP) .................................. 2011-101843

(51) Int. Cl.
G02F 1/1333 (2006.01)
G02F 1/1345 (2006.01)
F21V 8/00 (2006.01)

(52) U.S. Cl.
CPC ........ *G02F 1/133308* (2013.01); *G02B 6/0001* (2013.01); *G02F 1/13336* (2013.01); *G02F 1/13452* (2013.01); *G02F 1/1333* (2013.01)

(58) Field of Classification Search
None
See application file for complete search history.

(56) References Cited

U.S. PATENT DOCUMENTS

| 6,127,199 A | 10/2000 | Inoue et al. |
| 6,372,608 B1 | 4/2002 | Shimoda et al. |
| RE38,466 E | 3/2004 | Inoue et al. |
| 6,831,841 B2 * | 12/2004 | Oishi et al. .................... 361/760 |
| RE40,601 E | 12/2008 | Inoue et al. |

(Continued)

FOREIGN PATENT DOCUMENTS

| JP | 05-142558 A | 6/1993 |
| JP | 07-261189 A | 10/1995 |

(Continued)

OTHER PUBLICATIONS

Official Communication issued in International Patent Application No. PCT/JP2012/060822, mailed on Jul. 10, 2012.

*Primary Examiner* — Richard Kim
(74) *Attorney, Agent, or Firm* — Keating & Bennett, LLP

(57) ABSTRACT

A display module 1 of the present invention includes a first board 3, a second board 4, a base film 5, and a circuit member 2. The first board 3 and the second board 4 are bonded together to face with each other. The base film 5 is provided between the first board 3 and the second board 4 and extends outwardly from an end of the first board 3. The base film 5 has an insulating property and the extended portion is bent to an outer surface side of one of the first board 3 and the second board 4. The circuit member 2 is formed on the base film 5.

6 Claims, 22 Drawing Sheets

(56) References Cited

U.S. PATENT DOCUMENTS

| | | |
|---|---|---|
| 2002/0146893 A1 | 10/2002 | Shimoda et al. |
| 2003/0224582 A1 | 12/2003 | Shimoda et al. |
| 2004/0219762 A1 | 11/2004 | Shimoda et al. |
| 2004/0232413 A1 | 11/2004 | Yamazaki et al. |
| 2006/0030122 A1 | 2/2006 | Shimoda et al. |
| 2007/0010067 A1 | 1/2007 | Shimoda et al. |
| 2007/0158745 A1 | 7/2007 | Yamazaki et al. |
| 2009/0275196 A1 | 11/2009 | Yamazaki et al. |
| 2010/0026952 A1* | 2/2010 | Miura et al. .................. 349/150 |
| 2011/0159771 A1 | 6/2011 | Yamazaki et al. |
| 2011/0312111 A1 | 12/2011 | Yamazaki et al. |
| 2012/0211874 A1 | 8/2012 | Yamazaki et al. |
| 2013/0214434 A1 | 8/2013 | Yamazaki et al. |

FOREIGN PATENT DOCUMENTS

| | | |
|---|---|---|
| JP | 2004-140381 A | 5/2004 |
| JP | 2004-140382 A | 5/2004 |
| JP | 2004-140383 A | 5/2004 |
| JP | 2006-303163 A | 11/2006 |
| JP | 2009-258758 A | 11/2009 |
| JP | 2009-260387 A | 11/2009 |
| JP | 2009-272457 A | 11/2009 |
| WO | 2004/040648 A1 | 5/2004 |
| WO | 2008/105125 A1 | 9/2008 |

* cited by examiner

DISPLAY MODULE AND DISPLAY DEVICE

TECHNICAL FIELD

The present invention relates to a display module and a display device.

BACKGROUND ART

A display module such as a liquid crystal module and the like is widely used as a display unit of devices such as a television, a mobile phone, and portable information terminals. The liquid crystal module includes a liquid crystal panel and a circuit member such as an integrated circuit (IC) chip mounted on the liquid crystal panel. A liquid crystal panel that is used for a liquid crystal module generally includes a thin film transistor (TFT) array board, a color filter (CF) board that faces the TFT array board, and a liquid crystal layer that is sandwiched between the TFT array board and the CF board. The liquid crystal layer is surrounded by a frame-shaped sealing member and the liquid crystal layer and the sealing member are sandwiched and sealed by the two boards. A wiring pattern is arranged on an inner surface of the TFT array board that is located on an outer side from the sealing member.

The wiring pattern of the liquid crystal panel is electrically connected to a circuit member such as a tape carrier package (TCP) provided with an IC chip or a system on film (SOF). The IC chip is directly mounted on the inner surface of the TFT array board in a chip-on-glass (COG) system according to a type of the liquid crystal panel (for example, Patent Document 1).

An organic EL module including an organic EL panel and a circuit member such as an IC chip mounted thereon is another example of the display module.

Documents describing technologies related to the present application includes Patent Documents 2 to 7, for example.

Patent Document 1: Japanese Unexamined Patent Application Publication No. 2009-272457
Patent Document 2: International Publication No. WO 2004/040648
Patent Document 3: Japanese Unexamined Patent Application Publication No. 2004-140381
Patent Document 4: Japanese Unexamined Patent Application Publication No. 2004-140382
Patent Document 5: Japanese Unexamined Patent Application Publication No. 2004-140383
Patent Document 6: Japanese Unexamined Patent Application Publication No. 2009-258758
Patent Document 7: Japanese Unexamined Patent Application Publication No. 2009-260387

Problem to be Solved by the Invention

Recently, it has been desired to reduce a frame area located around a display area of a liquid crystal module (that is a display area of a liquid crystal panel). Especially, it has been desired to reduce a frame area in which the circuit member such as an IC chip is mounted. However, the conventional liquid crystal module (the liquid crystal panel) necessarily includes a portion (a space) to which the circuit member is connected on an end portion of the board. Therefore, the conventional liquid crystal module has limitations to reduce the frame area.

DISCLOSURE OF THE PRESENT INVENTION

The present invention was accomplished in view of the foregoing circumstances. An object of the present invention is to provide a technology that reduces a width of a portion of the frame area in which a circuit member is arranged. The frame portion is located to surround the display area of the display module.

Means for Solving the Problem

To solve the above problem, according to the present invention, a display module includes a first board and a second board that are bonded together to face with each other, an insulating base film arranged between the first board and the second board and extending outwardly from an end of the first board so as to be bent to an outer surface side of one of the first board and the second board, and a circuit member formed on the base film.

In the display module, the circuit member may be mounted on an outer surface side of the base film when the base film is bent to the outer surface side of the one of the first board and the second board.

The display module may further include a reinforcing member configured to reinforce a mount portion of the base film on which the circuit member is mounted. The reinforcing member may reinforce the mount portion from a rear side of the base film.

In the display module, the reinforcing member may have a plan shape following a plan shape of the mount portion of the circuit member.

In the display module, the reinforcing member may be formed of a same material as the first board.

In the display module, the base film may be formed of one film extending from a portion sandwiched between the first board and the second board to a portion corresponding to the circuit member.

A display device includes the display module and a lighting device configured to irradiate light to the display module.

A display module of the present invention includes a liquid crystal layer, a sealing member surrounding a periphery of the liquid crystal layer, a first board and a second board that are bonded together to face with each other, an insulating base film arranged between the first board and the second board and extending outwardly from an end of the first board so as to be bent to an outer surface side of one of the first board and the second board, and a circuit member formed on the base film.

In the display module, the circuit member may be mounted on an outer surface side of the base film when the base film is bent to the outer surface side of the one of the first board and the second board.

The display module may further include a reinforcing member configured to reinforce a mount portion of the base film on which the circuit member is mounted. The reinforcing member may reinforce the mount portion from a rear side of the base film.

In the display module, the reinforcing member may have a plan shape following a plan shape of the mount portion of the circuit member.

In the display module, the reinforcing member may be formed of a same material as the first board.

In the display module, the base film may be formed of one film extending from a portion sandwiched between the first board and the second board to a portion corresponding to the circuit member.

A method of manufacturing a liquid crystal module according to the present invention includes a precursor forming step, a separation step, and a removing step. In the precursor forming step, a liquid crystal module precursor is formed. The liquid crystal module precursor includes a liquid crystal layer, a sealing member surrounding a periphery of the liquid crystal layer, a first board and a second board, an insulating base film, and a circuit member. The first board and the second board are provided to sandwich the liquid crystal layer and the sealing member therebetween. An end of one of the boards is located outwardly from an end of the another one of the boards. The base film is arranged between the first board and the sealing member. The base film is formed on an inner surface of the first board such that an end of the base film is located outwardly from an end of the second board. The circuit member is formed on the base film. In the separation step, light is irradiated to the base film formed on a portion to be removed of the first board that is located outwardly from the vicinity of the end of the second board. The base film formed on the portion to be removed will be able to be bent to an outer surface side of one of the first board and the second board after removing the portion to be removed. Further, the base film is separated form the portion to be removed. In the removing step, the portion to be removed is cut off and removed from the first board.

In the method of manufacturing the liquid crystal module, the portion to be removed is configured with a portion of the first board excluding a portion to be remained. The portion to be remained ranges from the portion that extends outwardly from the vicinity of an end of the second board to a portion facing the circuit member. In the removing step, the portion to be removed may be cut off and removed from the first board to remain the portion to be remained on the base film.

In the method of manufacturing the liquid crystal module, the portion to be remained may have a plan shape following a plan shape of a mount portion of the circuit member, and in the removing step, the portion to be remained having a plan shape following a plan shape of the mount portion of the circuit member may be remained on the base film.

In the method of manufacturing the liquid crystal module, in the separation step, the light may be irradiated to a rear surface side of the base film via the portion to be removed of the first board.

In the method of manufacturing the liquid crystal module, in the separation step, laser light may be used as the light.

A display device of the present invention includes the liquid crystal module or a liquid crystal module manufactured with the method manufacturing the liquid crystal module, and a lighting device irradiating light to the liquid crystal module.

A liquid crystal module precursor according to the present invention includes a liquid crystal layer, a sealing member surrounding a periphery of the liquid crystal layer, a first board and a second board, an insulating base film, and a circuit member. The first board and the second board are provided to sandwich the liquid crystal layer and the sealing member therebetween. An end of one of the boards is located outwardly from an end of the another one of the boards. The base film is arranged between the first board and the sealing member. The base film is formed on an inner surface of the first board such that an end of the base film is located outwardly from an end of the second board. The circuit member is formed on the base film.

Another method of manufacturing a liquid crystal module includes a precursor forming step, a separation step, a removing step, and a mounting step. In the precursor forming step, a liquid crystal module precursor is formed. The liquid crystal module precursor includes a liquid crystal layer, a sealing member surrounding a periphery of the liquid crystal layer, a first board and a second board, and an insulating base film. The first board and the second board are provided to sandwich the liquid crystal layer and the sealing member therebetween. An end of one of the boards is located outwardly from an end of the another one of the boards. The base film is arranged between the first board and the sealing member. The base film is formed on an inner surface of the first board such that an end of the base film is located outwardly from an end of the second board. In the separation step, light is irradiated to the base film formed on a portion to be removed of the first board that is located outwardly from the vicinity of the end of the second board. The portion to be removed is a portion of the first board excluding a portion to be remained that includes a portion facing a portion to be mounted of the base film. The base film formed on the portion to be removed will be able to be bent to an outer surface side of one of the first board and the second board after removing the portion to be removed. After the irradiation of light, the base film is separated from the portion to be removed. In the removing step, the portion to be removed is cut off and removed from the first board and the portion to be remained is remained on the base film. In the mounting step, the circuit member is mounted on the portion to be mounted.

According to the other method of manufacturing the liquid crystal module, in the precursor forming step, a plurality of liquid crystal module precursors may be connected to each other to form a large panel.

In the other method of manufacturing the liquid crystal module, the portion to be remained has a plan shape following a plan shape of the circuit member, and the portion to be remained having a plan shape following a plan shape of the circuit member may be remained on the base film in the removing step.

Advantageous Effects of the Invention

According to the present invention, in the frame area surrounding the display area of the display module, a width of a portion in which the circuit member is arranged is reduced.

MODES FOR CARRYING OUT THE INVENTION

First Embodiment

Figure 1:
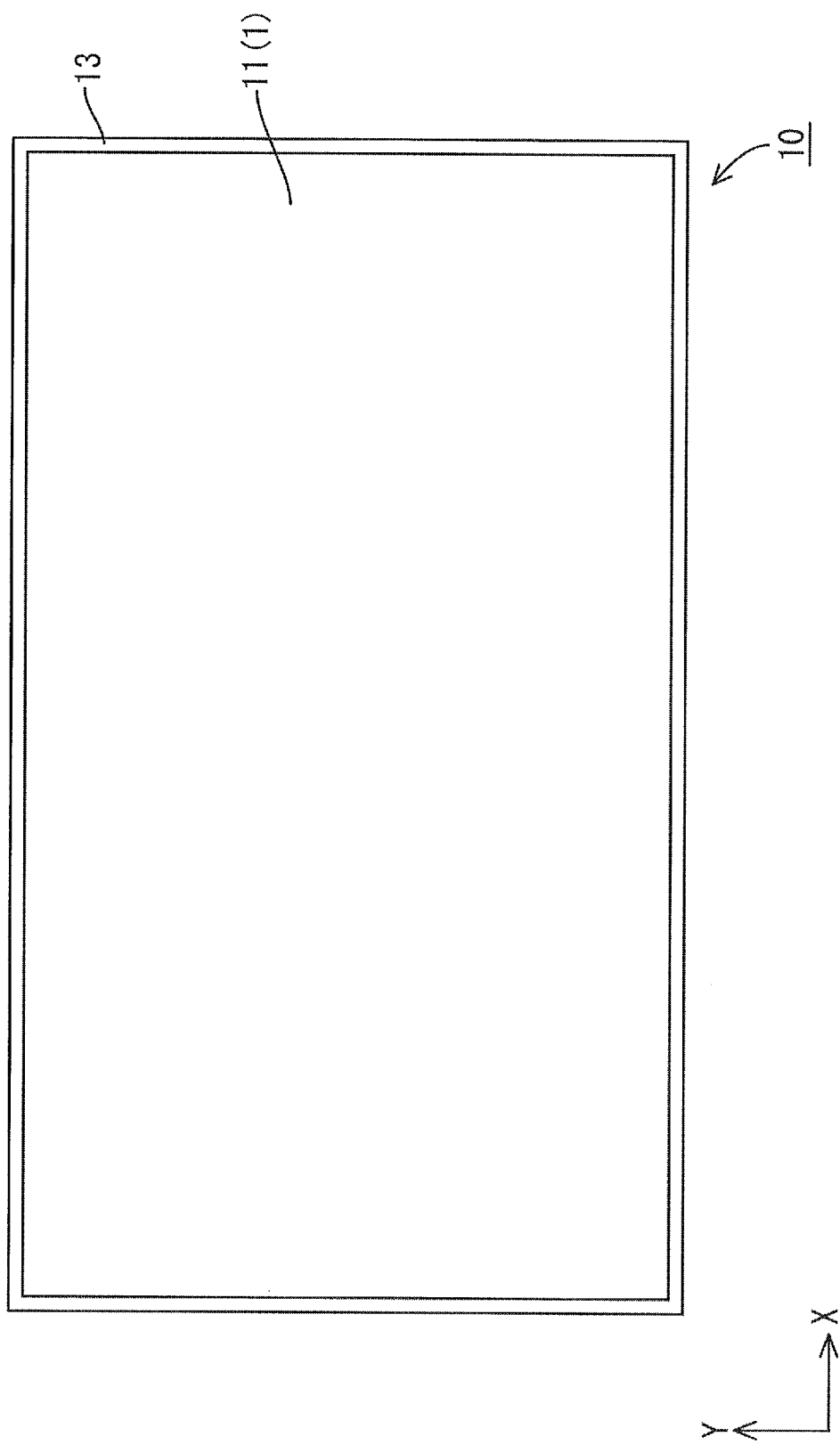
FIG. 1 is a plan view illustrating a liquid crystal display device of a first embodiment.
Figure 2:
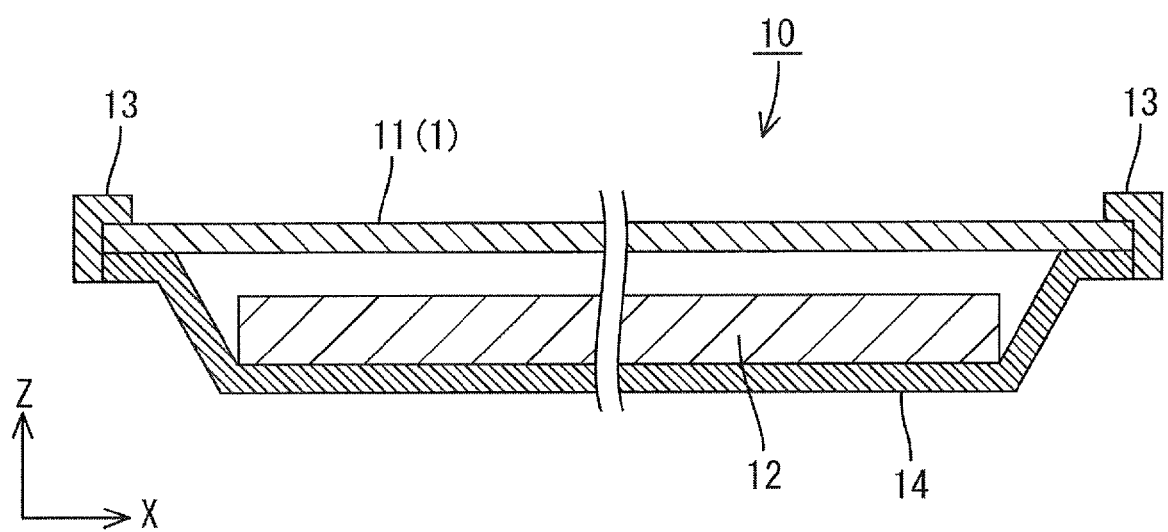
FIG. 2 is a cross sectional view illustrating the liquid crystal display device.

A first embodiment of the present invention will be explained with reference to FIGS. 1 to 10. In this embodiment, a liquid crystal display device (a display device) 10 will be described as an example. FIG. 1 is a plan view illustrating a liquid crystal display device 10 of the first embodiment. FIG. 2 is a cross sectional view illustrating the liquid crystal display device 10. In each drawing, an X-axis, a Y-axis, and a Z-axis are described as necessary.

(Liquid Crystal Display Device)

As illustrated in FIG. 1, the liquid crystal display device 10 has a rectangular outer appearance shape. FIG. 1 illustrates the liquid crystal display device 10 that is seen from a front-surface side. FIG. 2 typically illustrates a cross-sectional structure of the liquid crystal display device 10 that is taken along a long side of the display device. As illustrated in FIG. 2, the liquid crystal display device 10 of this embodiment mainly includes a liquid crystal module (an example of a display module) 1, a lighting device 12, a bezel 13, and a container 14. FIG. 1 illustrates the liquid crystal module 1 of the liquid crystal display device 10 and the frame-shaped bezel 13 that surrounds the liquid crystal module 1. The liquid crystal module 1 has a rectangular outer appearance shape.

Figure 3:
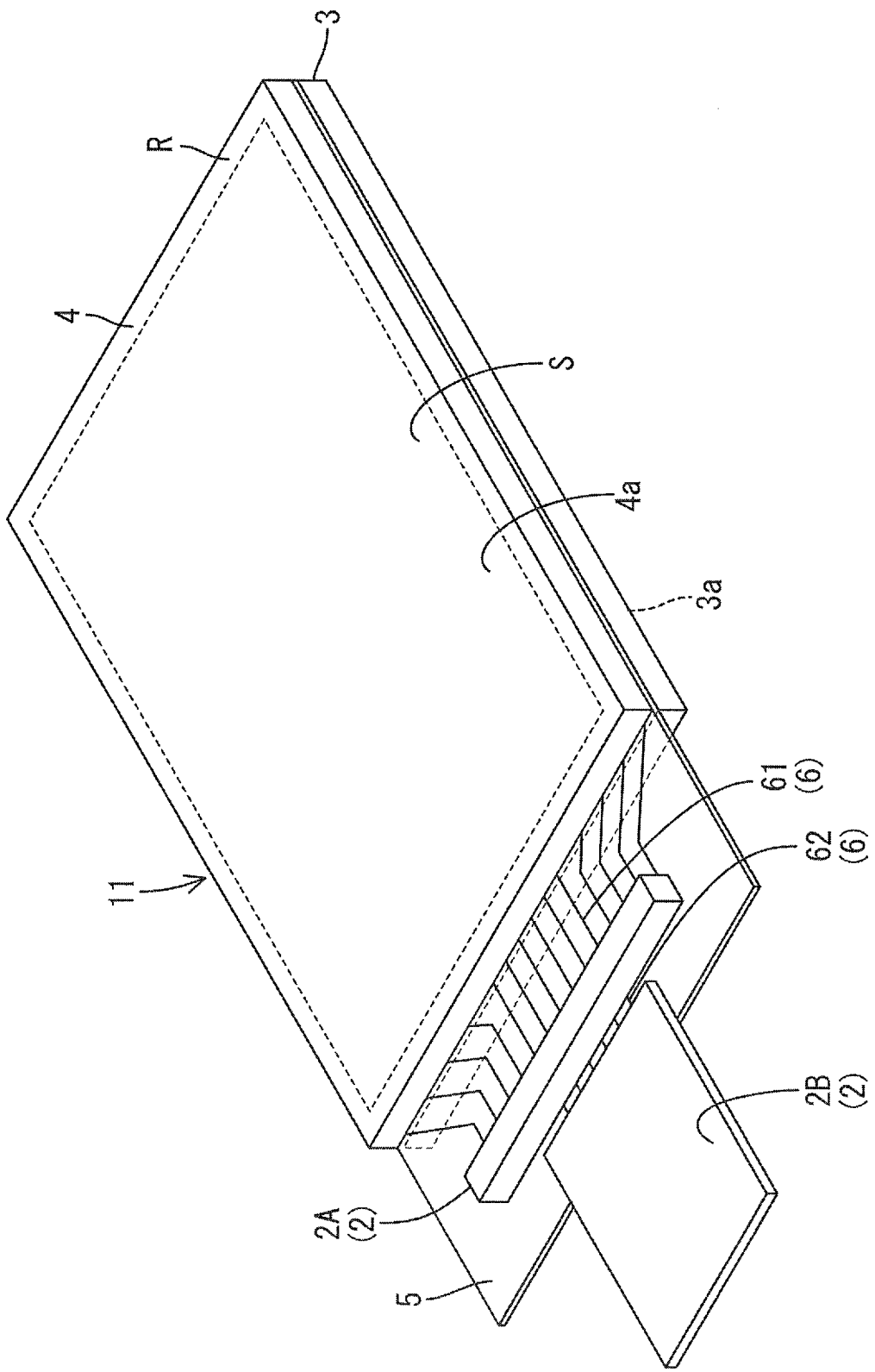
FIG. 3 is a perspective view illustrating a liquid crystal module.

FIG. 3 is a perspective view of the liquid crystal module 1. The liquid crystal module 1 includes a liquid crystal panel 11 and circuit members 2 (an IC chip 2A, a FPC 2B) that are mounted thereon.

The liquid crystal panel 11 mainly includes a liquid crystal layer 7 (see FIG. 6), a frame-shaped sealing member 8 that surrounds a periphery of the liquid crystal layer 7, and transparent boards 3, 4 that face each other with having the liquid crystal layer 7 and the sealing member 8 therebetween. One board 3 of the boards is a TFT array board (an example of a first board) and another board 4 of the boards is a CF board (an example of a second board). In this embodiment, the boards 3, 4 have a rectangular shape and substantially a same size. In FIG. 3, the board 3 is located on a lower side and the board 4 is located on an upper side. End portions of the boards 3, 4 are aligned with each other.

The TFT array board 3 mainly includes a transparent glass board, a plurality of TFTs and a plurality of transparent pixel electrodes that are arranged in a matrix (in lines and columns) on the glass board. The TFTs are switching components and each of the pixel electrodes is connected to a drain electrode of each TFT. One TFT and one pixel electrode are arranged for each pixel and each pixel is defined by a plurality of gate lines and a plurality of source lines that are arranged on the glass board so as to be perpendicular to each other. A gate electrode of each TFT is connected to the gate line and a source electrode of each TFT is connected to the source line. An alignment film that restricts alignment of the liquid crystal molecules contained in the liquid crystal layer 7 is formed on the TFT array board 3.

A base film 5 is formed on an inner surface of the TFT array board 3. A part of the base film 5 (a basal end portion) covers an inner surface of the TFT array board 3 and other part (a distal end portion) is located outside of (beyond) the sealing member 8 and located outside of (beyond) the end portion of the TFT array board 3. In this embodiment, the basal portion of the base film 5 is arranged directly on the glass board that configures the TFT array board 3. Namely, the TFTs, the pixel electrodes, the gate lines, and the source lines are arranged on the base film 5.

The base film 5 has flexibility and the portion of the base film 5 that is located outside is able to be bent (folded) toward an outer surface side 4a of the TFT array board 4 or an outer surface side 3a of the CF board 4.

Specifically, the base film 5 is formed of an organic film of insulation. An organic high-molecular compound that configures such an organic film of insulation includes, for example, polyimide (PI), polyethylene terephthalate (PET), polyester, polyethylene naphthalate (PEN), polyether ether ketone (PEEK), polycarbonate (PC), polyether sulfone (PES), polyarylate (PAR), polychroorefin (PCO) and the like. The base film 5 is configured with one organic film.

The basal end portion of the base film 5 is sandwiched by the TFT array board 4 and the sealing member 8, as will be described later. On the portion of the base film 5 that is located outside the sealing member 8, the wiring pattern 6 is arranged. The wiring pattern 6 is configured with a plurality of metal wires that are formed in a pattern on the base film 5. In this embodiment, the wiring pattern 6 includes outgoing lines 61 and external connection lines 62. The outgoing lines 61 extend outside of the sealing member 8 from the corresponding source lines and gate lines that are located inside of the sealing member 8. A pad (not illustrated) is arranged on an end portion of each of the outgoing lines 61. The external connection lines 62 electrically connect the IC chip 2A and the FPC 2B. A pad (not illustrated) is arranged on two end portions of each external connection line 62.

The CF board 4 mainly includes a transparent glass board and CFs of red (R), green (G) and blue (B) that are arranged on the transparent glass board in a matrix such that each of the CFs corresponds to each pixel of the TFT array board 3. Each CF is defined by a light-blocking black matrix (hereinafter, referred to as BM) that is arranged on the glass board in a matrix. On the CFs and the BM, transparent counter electrodes that face the pixel electrodes on the TFT array board 3 and an alignment film that restricts alignment of liquid crystal molecules are arranged.

As illustrated in FIG. 3, the liquid crystal module 1 includes the base film 5 of the liquid crystal panel 11 and the IC chip 2A and the flexible printed circuits (FPC) 2B that are mounted on the base film 5. The IC chip 2A and the FPC 2B configure the circuit member 2. The base film 5 of the liquid crystal module 1 is used as a mount area in which the IC chip 2A and the like are mounted.

The IC chip 2A is a chip component for driving liquid crystals that includes a driver and a timing controller for driving each TFT of the TFT array board 3. The IC chip 2A is arranged between the outgoing lines 61 and the external connection lines 62 so as to be connected to the outgoing lines 61 and the external connection lines 62. An input bump electrode (not illustrated) and an output bump electrode (not illustrated) are arranged on a bottom surface of the IC chip 2A. The input bump electrode is connected to the one pad of the external connection line 62. The output bump electrode is connected to the pad of the outgoing line 61. Each bump electrode of the IC chip 2A is electrically connected to each pad of the wires 61, 62 via an anisotropic conductive film (ACF) (not illustrated). A protection film may be arranged over the wiring pattern 6 formed on the base film 5, if necessary.

The FPC 2B includes a base board made of polyimide or the like and a plurality of lines made of copper foil that are arranged on a surface of the base board. The end of each line of the FPC 2B is electrically connected to the other pad provided with the external connection line 62 via the ACF. Signals output from the FPC 2B are input to the liquid crystal panel 11 via the IC chip 2A. The liquid crystal module 1 (the liquid crystal panel 11) of this embodiment is activated in an active matrix method.

A polarizing plate (not illustrated) is arranged on an outer surface of the TFT array board 3 and on an outer surface of the CF board 4 of the liquid crystal panel 11.

As illustrated in FIG. 3 and other drawings, a display area S of the liquid crystal panel 11 is configured with a portion that is inside from the frame-shaped sealing member 8 (an inner-side portion from an inner edge of the sealing member 8), and a non-display area R is configured with a portion that is outside from the display area S. The display area S of the liquid crystal panel 11 is a display area S of the liquid crystal module 1 and the non-display area R of the liquid crystal panel 11 is a non-display area R of the liquid crystal module 1.

A lighting device 12 is arranged on a rear-surface side of the liquid crystal module 1 including the liquid crystal panel 11. The lighting device 12 is arranged in a box-shaped container 14 and the liquid crystal module 1 (the liquid crystal penal 11) is arranged on a peripheral edge of the container 14. The lighting device 12 irradiates light to the rear-surface side of the liquid crystal module 1 (the liquid crystal panel 11). A frame-shaped bezel is arranged to cover a peripheral edge of the liquid crystal module 1 (the liquid crystal panel 1).

(Method of Manufacturing Liquid Crystal Module)

With reference to FIGS. 4-8, a method of manufacturing the liquid crystal module 1 will be explained. The method of manufacturing the liquid crystal module 1 of this embodiment includes a precursor forming step, a separation step, and a removing step.

Figure 4:
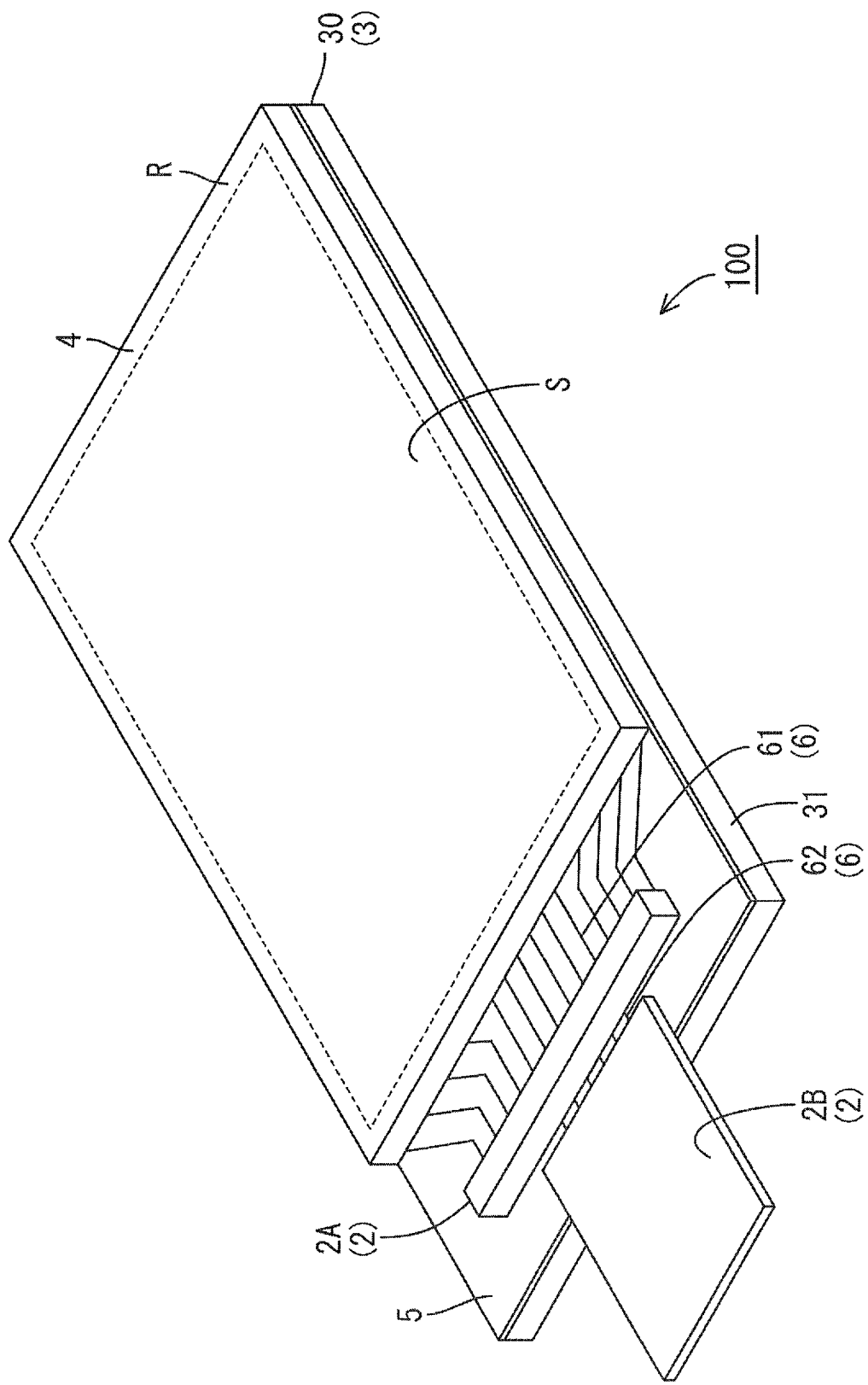
FIG. 4 is a perspective view illustrating a liquid crystal module precursor.
Figure 5:
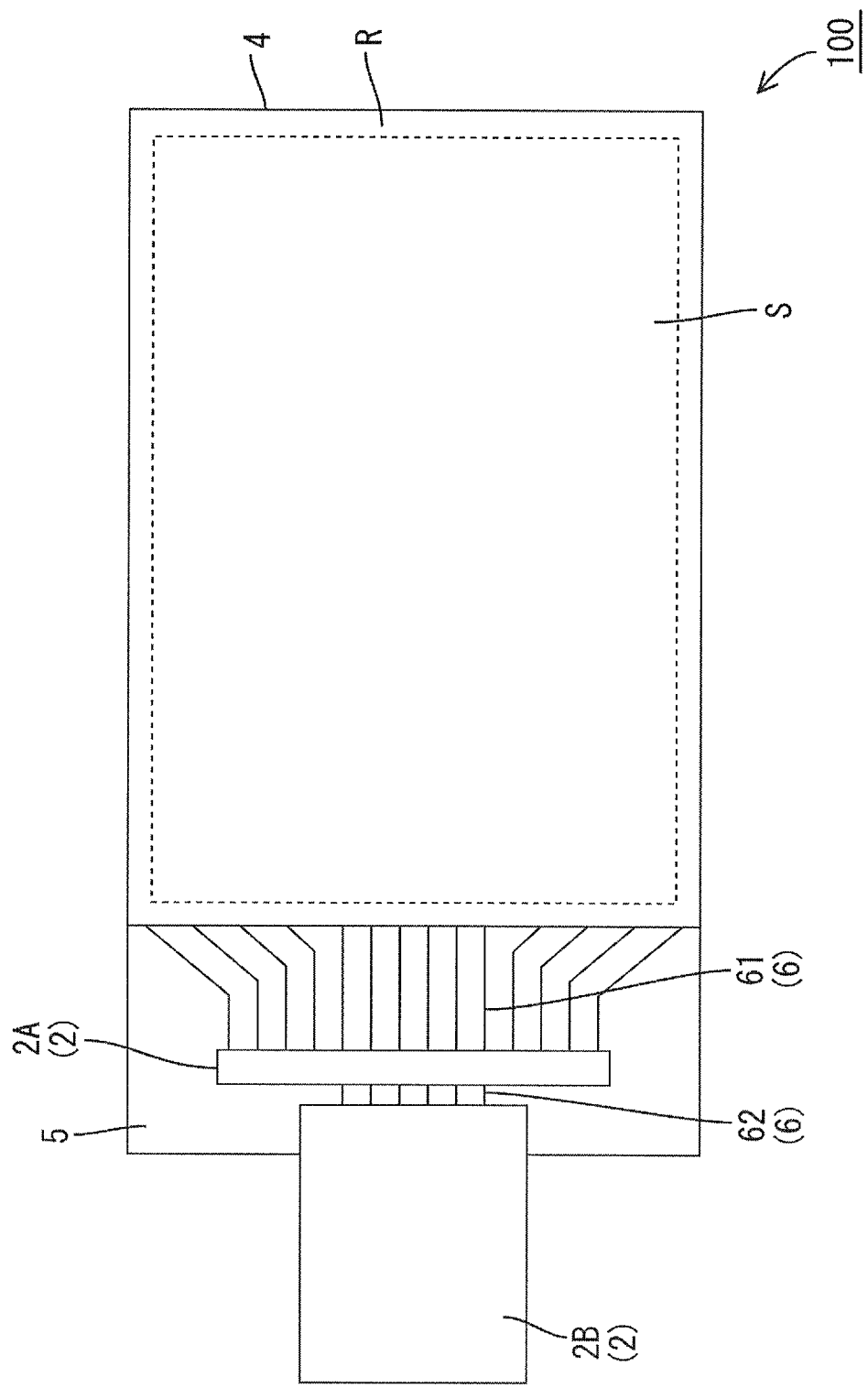
FIG. 5 is a plan view illustrating the liquid crystal module precursor.

The precursor forming step is a step of forming a liquid crystal module precursor 100. The liquid crystal module precursor 100 is used for manufacturing the liquid crystal module 1. The liquid crystal module precursor 100 is processed to have a predetermined shape as will be described and the liquid crystal module 1 is obtained. Namely, the liquid crystal module precursor 100 is in an intermediate step of manufacturing the liquid crystal module 1. FIG. 4 is a perspective view of the liquid crystal module precursor 100, and FIG. 5 is a plan view of the liquid crystal module precursor 100. The liquid crystal module precursor 100 will be explained.

Most of the configurations of the liquid crystal module precursor 100 illustrated in FIG. 4 is same as the configurations of the liquid crystal module 1 illustrated in FIG. 3. The TFT array board 3 of the liquid crystal module precursor 100 is greater in size than that of the liquid crystal module 1 and an end of the TFT array 3 of the liquid crystal module precursor 100 extends outside over the end of the CF board 4. The portion of the TFT array board 3 that extends over the end of the CF board 4 is an extended portion 31. The extended portion 31 has been originally provided continuously from and integrally with the end of the TFT array board 3 of the liquid crystal module 1 illustrated in FIG. 3. In this embodiment, the extended portion 31 is a part of a transparent glass plate that configures the TFT array board 3. In the liquid crystal module precursor 100, the TFT array board 3 including the extended portion 31 may be referred to as an original board 30 (see FIG. 4).

The base film 5 is arranged on a surface of the extended portion 31. In the state of the liquid crystal module precursor 1, the base film 5 is arranged on the inner surface of the original board 30 including a main portion and the extended portion thereof. Such a base film 5 is formed on an entire inner surface of the original board 30 with using a known film formation method. The base film 5 is made of the above-described organic film.

A wiring pattern 6 (61, 62) is formed with a known method on the base film 5 that is provided on the extended portion 31. Namely, the wiring pattern 6 is not formed on the base film 5 that is in a flexible state but on the base film 5 that is fixed on the extended portion 31. The IC chip 2A and the FPC 2B are also mounted on the base film 5 that is fixed on the extended portion 31. Namely, the circuit members 2 such as the IC chip 2A are mounted directly on the TFT array board 3 (the original board 30).

Each of the original board 30 and the CF board 4 is previously manufactured and they are bonded together with having the liquid crystal layer 7 and the sealing member 8 therebetween, and accordingly, the liquid crystal module precursor 100 is obtained. In bonding the original plate 30 and the CF board 4, a position of each of the original plate 30 and the CF board 4 is adjusted such that the extended portion 31 of the original board 30 extends further from the end of the CF board 4, as illustrated in FIG. 4. The circuit members 2 such as the IC chip 2A may be mounted on the original board 30 after the boards 30, 4 are bonded, or the circuit members 2 may be mounted on the original board 30 before the bonding.

Figure 6:
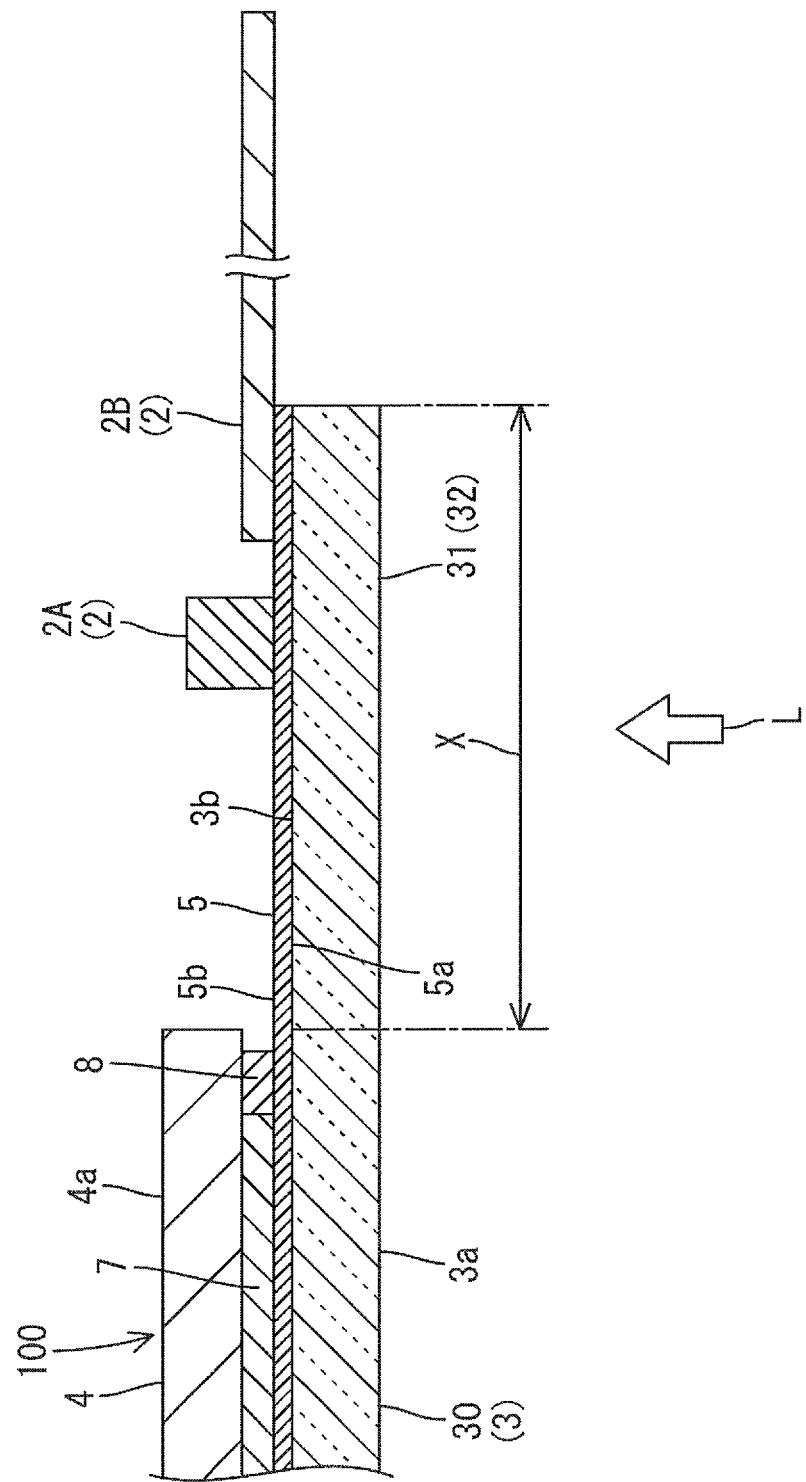
FIG. 6 is an explanation view typically illustrating a separation step.

In the separation step, light L is irradiated to a portion of the base film 5 formed on the extended portion 31 that is a portion to be removed 32 and the base film 5 is separated from the extended portion 31. FIG. 6 typically illustrates the separation step. FIG. 6 typically illustrates a cross-sectional configuration of the vicinity of the extended portion 31 of the liquid crystal module precursor 100. In the separation step, laser light L is irradiated to a rear surface 5a of the base film 5 that is formed on a front surface (an inner surface) 3b of the extended portion 31 from an outer surface 3a side of the original board 30 (the TFT array board 3) via the original board 30 (the extended portion 31). A range X to which the laser light L is irradiated ranges from a position of the base film 5 corresponding to a distal end of the CF board 4 to a position corresponding to an end of the original board 30 (the extended portion 31).

The laser light L is irradiated to the rear surface of the base film 5 via the original board 30 (the TFT array board 3) selectively within the range X. The laser light L may be irradiated to the base film 5 within the range X via a photo mask having an opening corresponding to a shape of the range X. If the laser light L is irradiated, abrasion or the like occurs on the rear surface 5a side of the base film 5 and the base film 5 is separated from the front surface of the extended portion 31. In the separation step, with the irradiation of the laser light L, the base film 5 may be completely separated from the extended portion 31 or a sticking force (a bonding force) between the base film 5 and the extended portion 31 may be reduced such that the portion to be removed 32 is easily removed from the base film 5 in the removing step that will be described later. Various conditions such as a kind of the laser light L, irradiation time of the laser light L, output of the laser light L or other conditions are appropriately set. In another embodiment, light other than the laser light L may be used for the separation step as long as the base film 5 can be removed from the extended portion 31.

Figure 7:
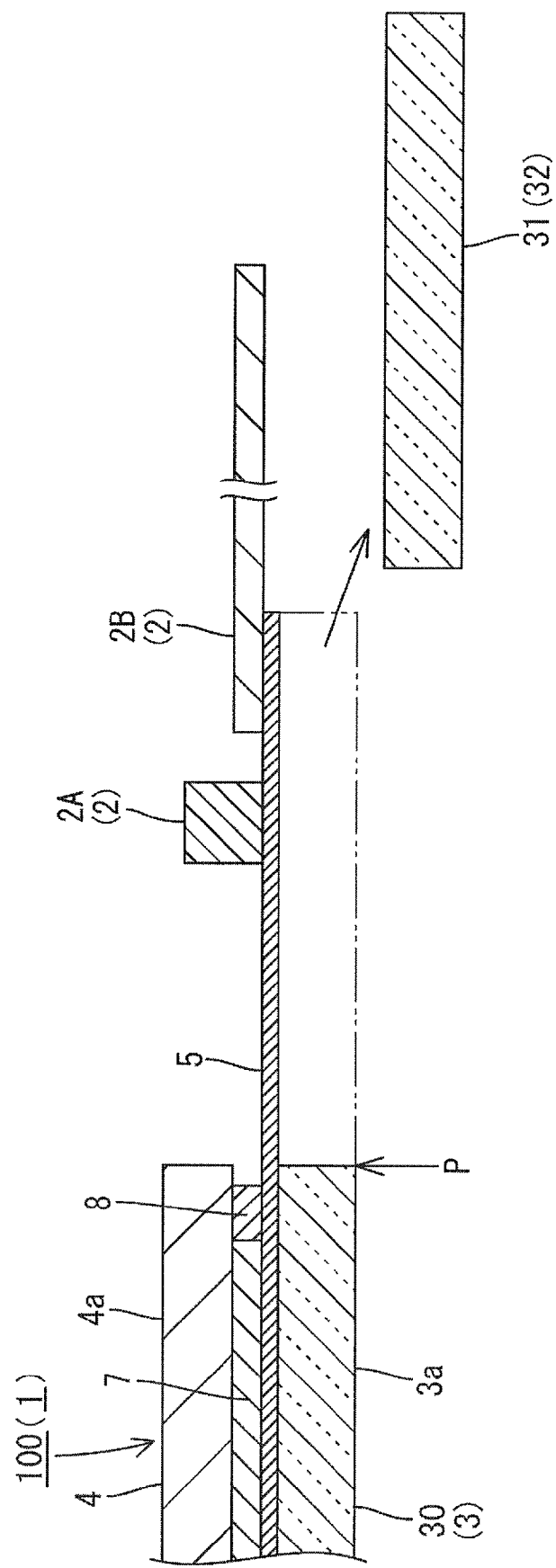
FIG. 7 is an explanation view typically illustrating a removing step.

In the removing step, the extended portion 31 that is the portion to be removed 32 is cut off from the original board 30 and removed. FIG. 7 typically illustrates the removing step. FIG. 7 typically illustrates a cross-sectional configuration of the liquid crystal module precursor 100 in which the extended portion 31 is cut off from the original board 30 illustrated in FIG. 6. In the removing step, a scribe groove is formed on the outer surface 3a of the original board 30 with using a cutter wheel or the like. For example, a cutter wheel having a rotary blade containing a single crystal of artificial diamond is used as the cutter wheel. The rotary blade is rotated with being pressed to the outer surface 3a of the original board 30 and the scribe groove is formed. The scribe groove is formed at a position P on the original board 30 that corresponds to the end of the CF board 4. Next, an external force is applied to the extended portion 31 of the original board 30 on which the scribe groove is formed at the position P, and accordingly, the extended portion 31 is separated from the original board 30 and removed therefrom.

In the separation step, if the sticking force (the bonding force) between the base film 5 and the extended portion 31 is reduced to some extent, the extended portion 31 is completely separated from the base film 5 in the removing step.

In other embodiment, before performing the separation step, the scribe groove may be previously formed on the outer surface 3a of the original board 30.

After the extended portion 31 is removed from the original board 30, the base film 5 that has been fixed on the extended portion 31 can be bent. After performing the above steps, the liquid crystal module 1 is obtained from the liquid crystal module precursor 100.

Figure 8:
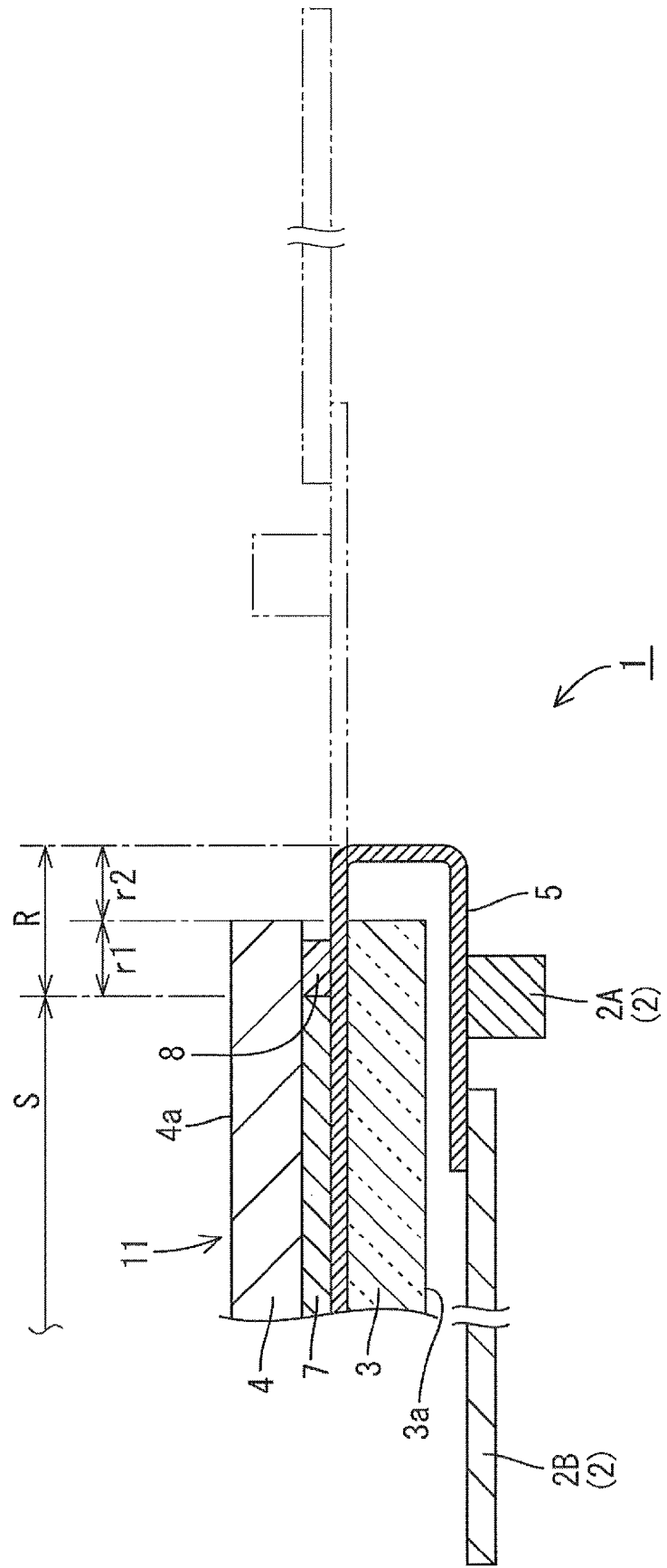
FIG. 8 is a cross sectional view typically illustrating a structure of an end portion of the liquid crystal module.

FIG. 8 is a cross-sectional view typically illustrating a configuration of an end part of the liquid crystal module 1. The liquid crystal module 1 illustrated in FIG. 8 is obtained with the above-described method of manufacturing the liquid crystal module 1. In the liquid crystal module 1 illustrated in FIG. 8, the base film 5 is bent (folded) to the outer surface 3a side of the TFT array board 3. The IC chip 2A and the FPC 2B are arranged on the outer surface 3a side of the TFT array board 3. Namely, the IC chip 2A and the FPC 2B are arranged on a rear surface side of the liquid crystal module 1. The base film 5 on which the circuit members 2 are mounted is folded to the outer surface 3a side of the TFT array board 3 and the liquid crystal module 1 including such a folded base film 5 is mounted in the liquid crystal display device 10.

In the liquid crystal module 1 of this embodiment, the frame area R is reduced and the frame area R includes an area r1 and an area r2, as illustrated in FIG. 8. The area r1 ranges from an inner edge of the sealing member 8 to the end of each board 3, 4, and the area r2 that extends outwardly from the end of each board 3, 4.

In the liquid crystal module 1 of this embodiment, the base film 5 on which the wiring pattern 6 is formed is integrally formed with the liquid crystal panel 11. Namely, the base film 5 is not an external member that is mounted to the liquid crystal panel 11 via an ACF or the like. A part of the base film 5 is sandwiched between the TFT array board 3 and the sealing member 8. Namely, the base film 5 is fixed to the liquid crystal panel 11 by at least the sandwiched portion. The liquid crystal module 1 does not necessarily have a space for receiving the base film 5 as an external member, and therefore, the portion of the frame area R corresponding to the area r1 is reduced to be a small area. The area r1 can be adjusted according to a size of the extended portion 31 that is separated and removed from the original board 30.

The area r2 of the frame area R is configured with a folded portion of the base film 5. A size of the area r2 is substantially same as that of a folded portion of the FPC that is an external member mounted to the conventional liquid crystal panel (for example, approximately 0.7 mm).

As described before, the liquid crystal module 1 of this embodiment is configured to set a reduced frame area R. Therefore, the display area S can have a greater size compared to a conventional one. According to the liquid crystal module 1 of this embodiment, the circuit members 2 are arranged on the outer surface 3a side of the TFT array board 3, and therefore, the frame area R can be reduced in size.

In another embodiment, the circuit members 2 (such as the IC chip 2A) may be arranged on an end surface side of the TFT array board 3. In such a case, the area r2 increases compared to the one in this embodiment, however, the area r1 is sufficiently reduced similar to this embodiment. Therefore, the whole frame area R is reduced in size compared to the conventional one.

Figure 9:
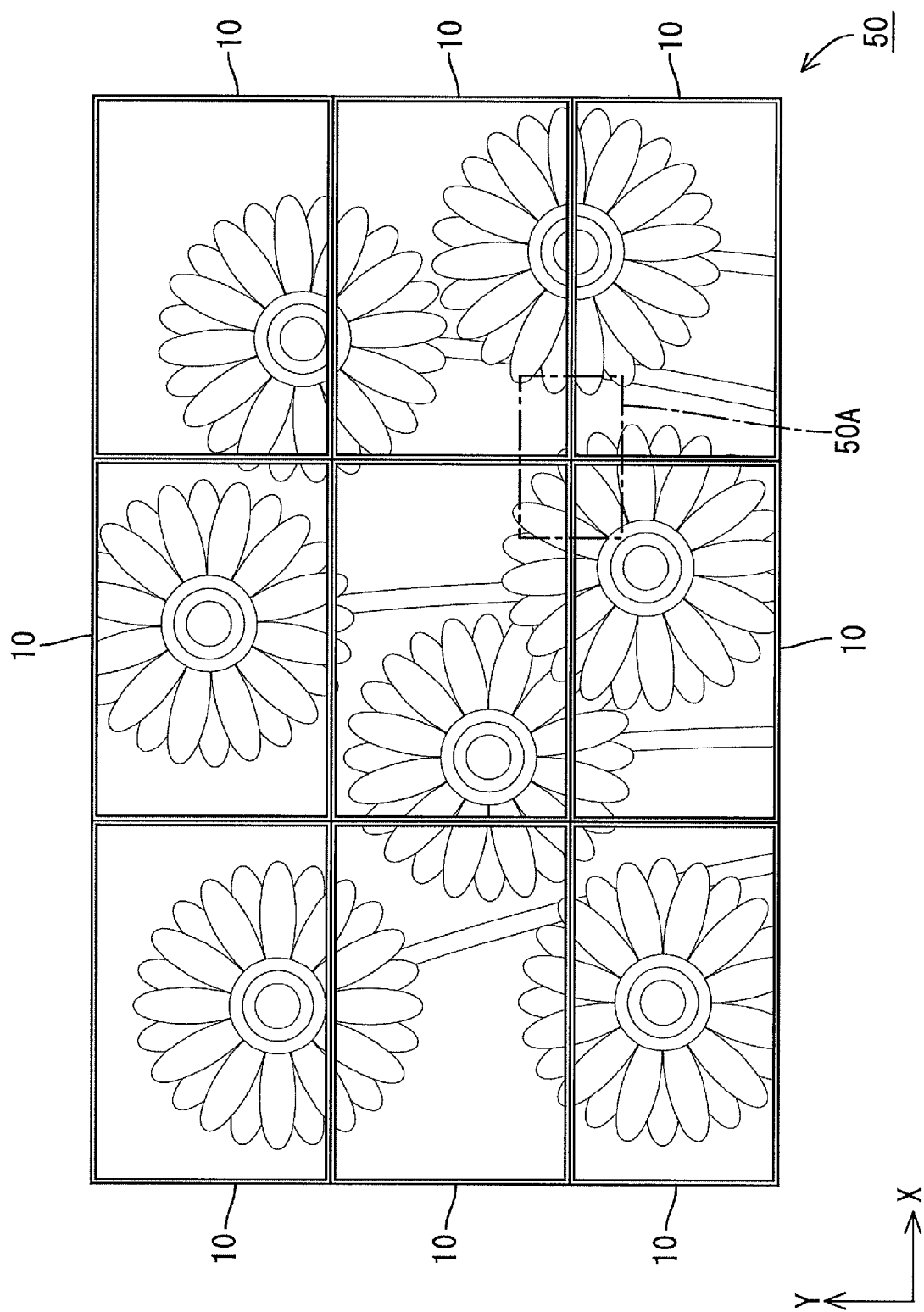
FIG. 9 is a plan view illustrating a multi display configured with a plurality of liquid crystal display devices.
Figure 10:
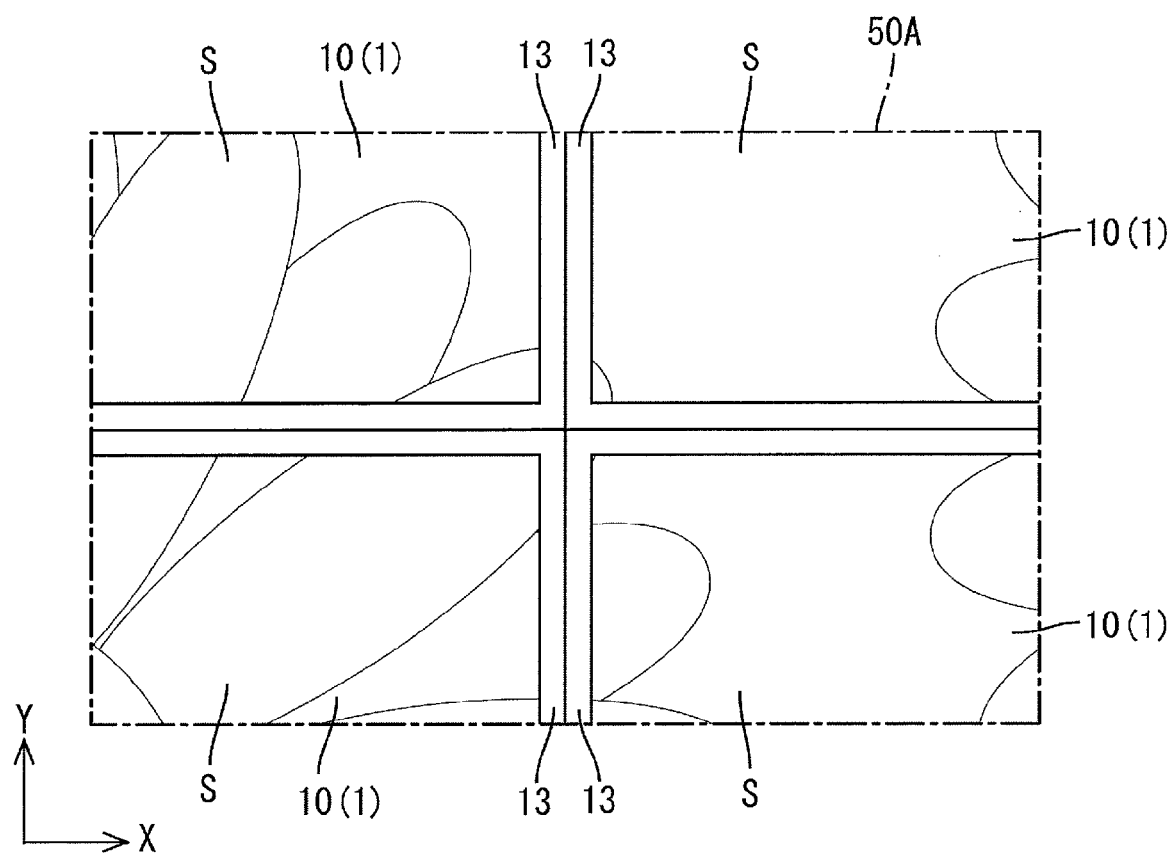
FIG. 10 is an enlarged plan view illustrating the multi display illustrated in FIG. 9.

FIG. 9 is a plan view of a multi display 50 including a plurality of the liquid crystal display devices 10. FIG. 10 is an enlarged plan view of the multi display 50 illustrated in FIG. 9. In the liquid crystal module 1 of this embodiment, the frame area R is reduced as described before. Therefore, the frame area (a width of the bezel 13) is reduced in the liquid crystal display device 10 including the liquid crystal module 1. Therefore, the liquid crystal display device 10 of this embodiment is effectively used for a display device configuring the multi display 50, for example. FIG. 10 illustrates an enlarged view of the multi display within an area 50A illustrated in FIG. 9. As illustrated in FIG. 10, if the width of each bezel 13 is small, a space between the display areas S of the adjacent liquid crystal display devices 10 is also small. Therefore, if the display areas S of the liquid crystal display devices 10 are combined as the multi display 50 to display one image, the matrix-shaped non-display area that is formed between the adjacent display areas S is less likely to be distinguished.

The liquid crystal module 1 of this embodiment may be used for various usages other than the multi display 50.

Second Embodiment

Figure 11:
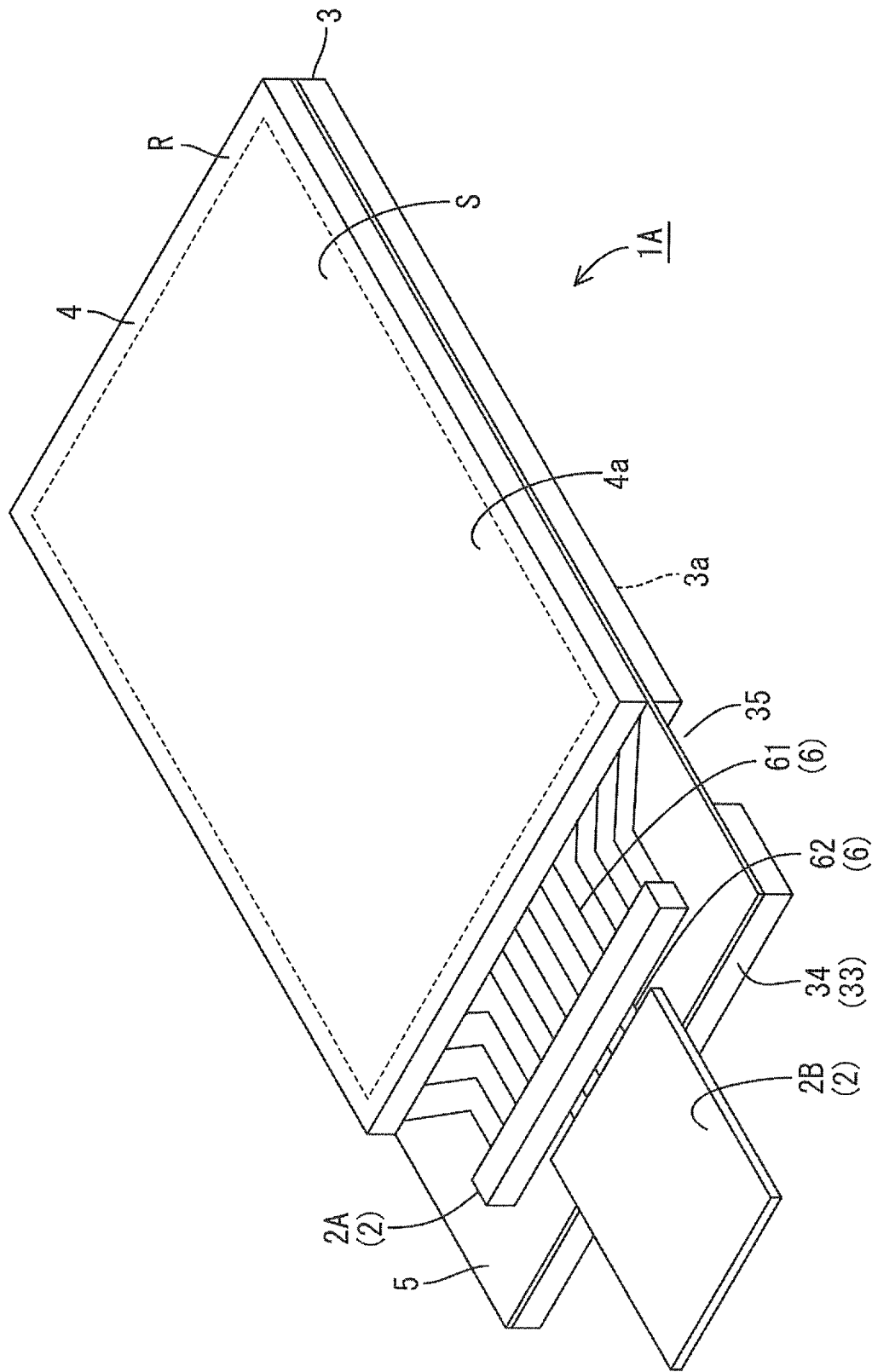
FIG. 11 is a perspective view illustrating a liquid crystal module according to a second embodiment.

Next, a second embodiment of the present invention will be explained with reference to FIGS. 11 to 14. In each of following embodiments, components same as those of the first embodiment are applied with same numerals or symbols as those of the first embodiment and they will not be explained. FIG. 11 is a perspective view of a liquid crystal module 1A of the second embodiment. A basic configuration of the liquid crystal module 1A is same as that of the first embodiment. Similar to the first embodiment, the liquid crystal module 1A is manufactured by processing the liquid crystal module precursor 10 (see FIG. 4). However, in the liquid crystal module 1A of the second embodiment, the portion of the base film 5 on which the IC chip 2A and the FBC 2B are mounted is reinforced by a reinforcing member 34.

A method of manufacturing the liquid crystal module 1A will be explained. As described before, similar to the first embodiment, the liquid crystal module 1A is manufactured with processing the liquid module precursor 100. Therefore, the method of manufacturing the liquid crystal module 1A also includes the precursor forming step similar to the first embodiment.

However, this embodiment is different from the first embodiment in a range X1 of the base film 5 to which the light L is irradiated in the separation step and the portion to be removed 32 from the original board 30 in the removing step.

Figure 12:
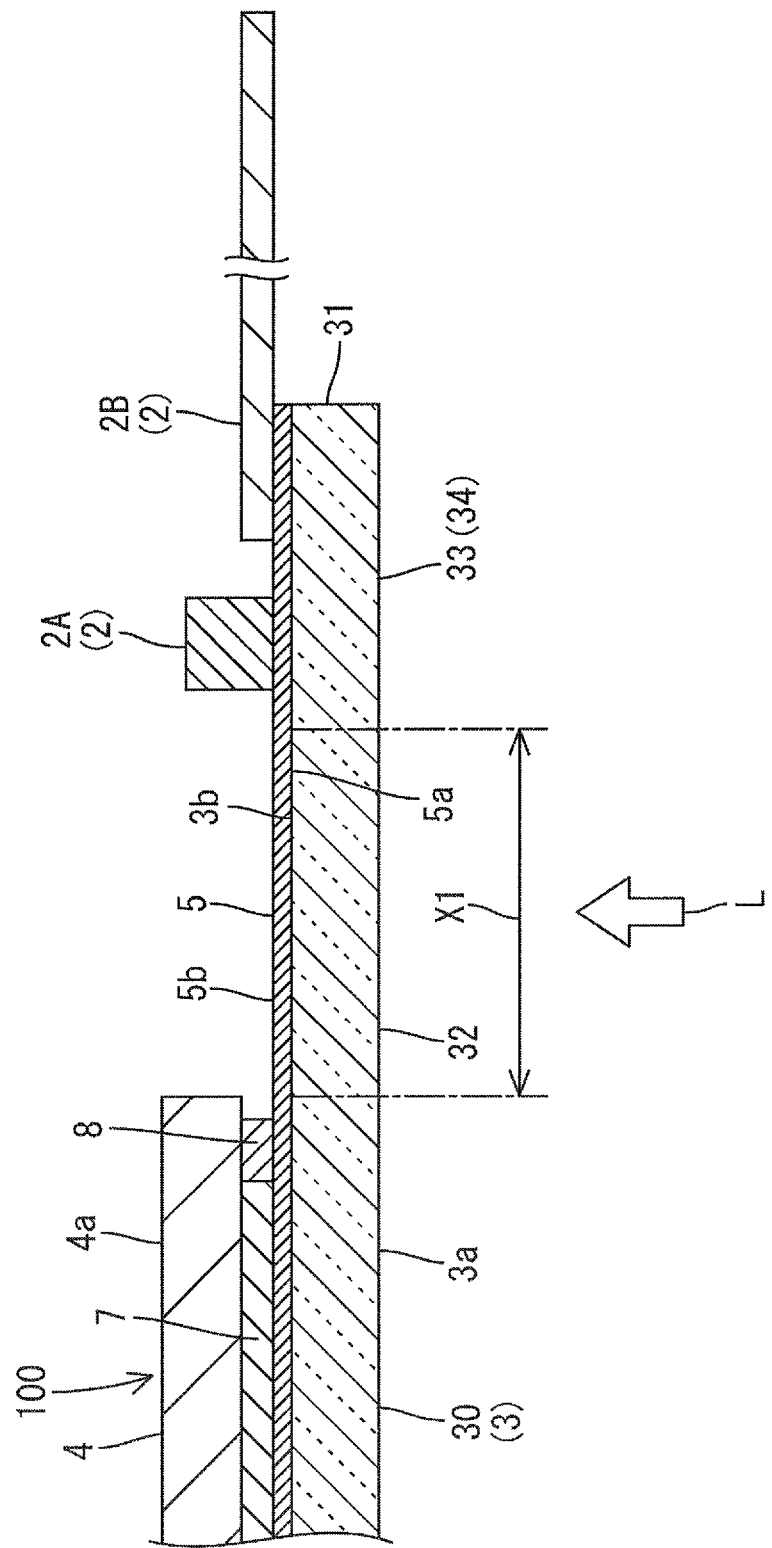
FIG. 12 is an explanation view typically illustrating a separation step according to the second embodiment.

FIG. 12 typically illustrates a separation step of the second embodiment. In this embodiment, the extended portion 31 of the original board 30 is divided into the portion to be removed 32 and a portion to be remained 33. Therefore, in the separation step, the light L is irradiated to the base film 5 formed on the portion to be removed 32 in the extended portion 31. FIG. 12 typically illustrates a cross-sectional configuration of the vicinity of the extended portion 31 of the liquid crystal module precursor 100. In the separation step, the laser light L is irradiated to the rear surface 5a of the base film 5 formed on the surface (the inner surface) 3b of the portion to be removed 32 from the outer surface 3a side of the original board 30 (the TFT array board 3) via the original board 30 (the portion to be removed 32). The range X1 to which the laser light L is irradiated ranges from a position of the base film 5 corresponding to the distal end of the CF board 4 to a position inside (on the sealing member 8 side) the portion on which the IC chip 2A is mounted (a mounted portion). Namely, the range X1 is smaller than the range X of the first embodiment.

The portion to be remained 33 corresponds to the portion of the extended portion 31 remaining after removing the portion to be removed 32. The portion to be remained 33 faces the rear surface 5a of the base film 5 including an area of the portion on which the IC chip 2A and the FPC 2B are mounted (a mount portion). In the separation step of this embodiment, the light L is not irradiated to the base film 5 that is formed on the portion to be remained 33.

The laser light L is selectively irradiated to the rear surface 5a of the base film 5 within the range X1 via the portion to be removed 32 of the original plate 30. The base film 5 that is formed on the portion to be removed 32 is separated from the extended portion 31 (the portion to be removed 32) of the original board 30.

Figure 13:
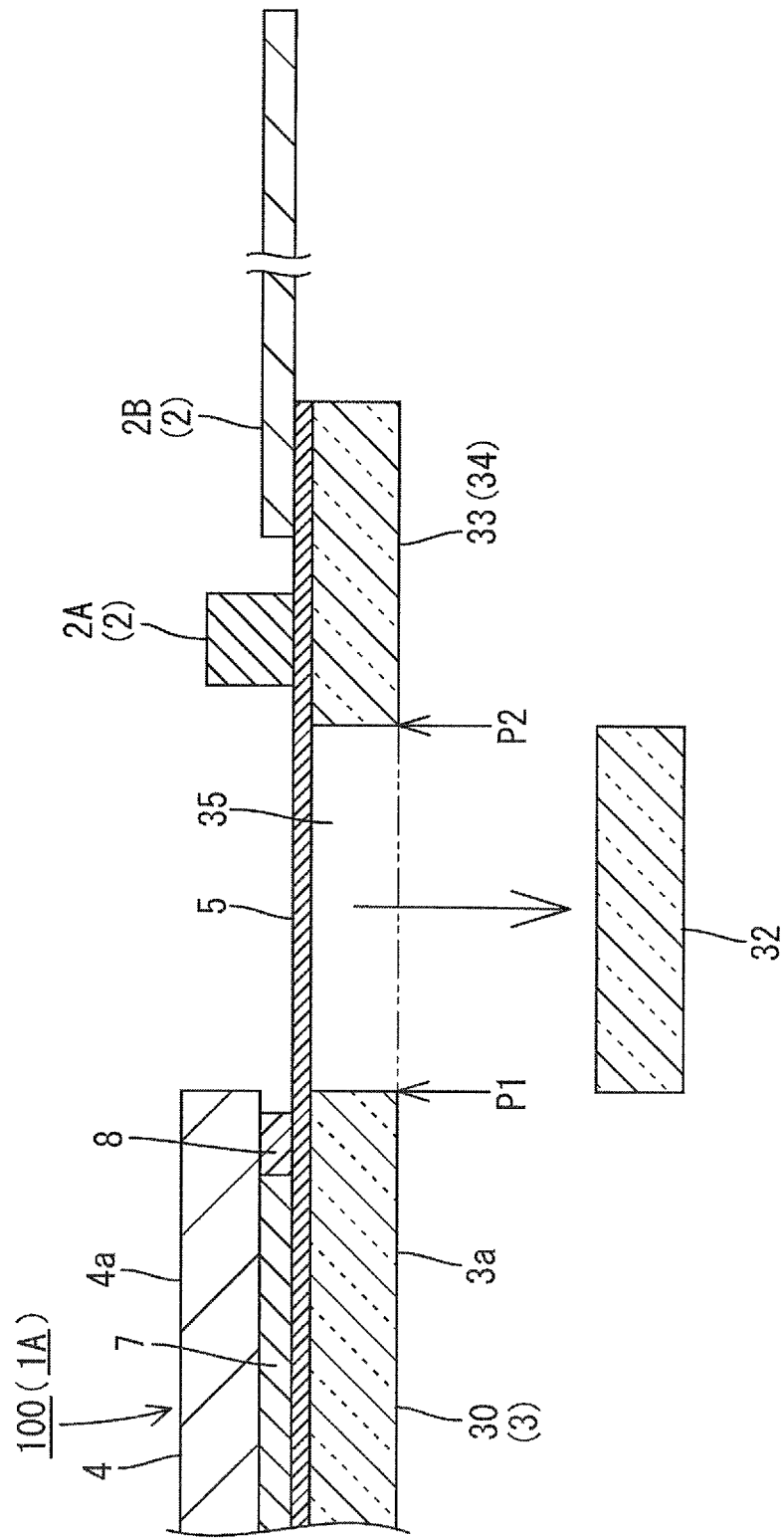
FIG. 13 is an explanation view typically illustrating a removing step according to the second embodiment.

FIG. 13 typically illustrates the removing step of the second embodiment. In the removing step of this embodiment, only the portion to be removed 32 is cut off from the original board 30. FIG. 13 typically illustrates a cross-sectional configuration of the liquid crystal module precursor 100 in which the portion to be removed 32 is removed from the original board 30 illustrated in FIG. 12. In this embodiment, similar to the first embodiment, a scribe groove is formed on each of the positions P1, P2 on the outer surface 3a of the original board 30. Each of the positions P1, P2 corresponds to an outer end portion of each portion to be removed 32. The scribe grooves are formed on the original board 30, and if an external force is applied from outside to the extended portion 31 of the original board 30, the portion to be removed 32 is separated and removed from the original board 30. The portion to be remained 33 remains on the base film 5 with sticking (being bonded) and without being removed and becomes the reinforcing member 34 as described before. A space 35 is formed between the reinforcing member 34 and the TFT array board 3, as illustrated in FIG. 13.

Figure 14:
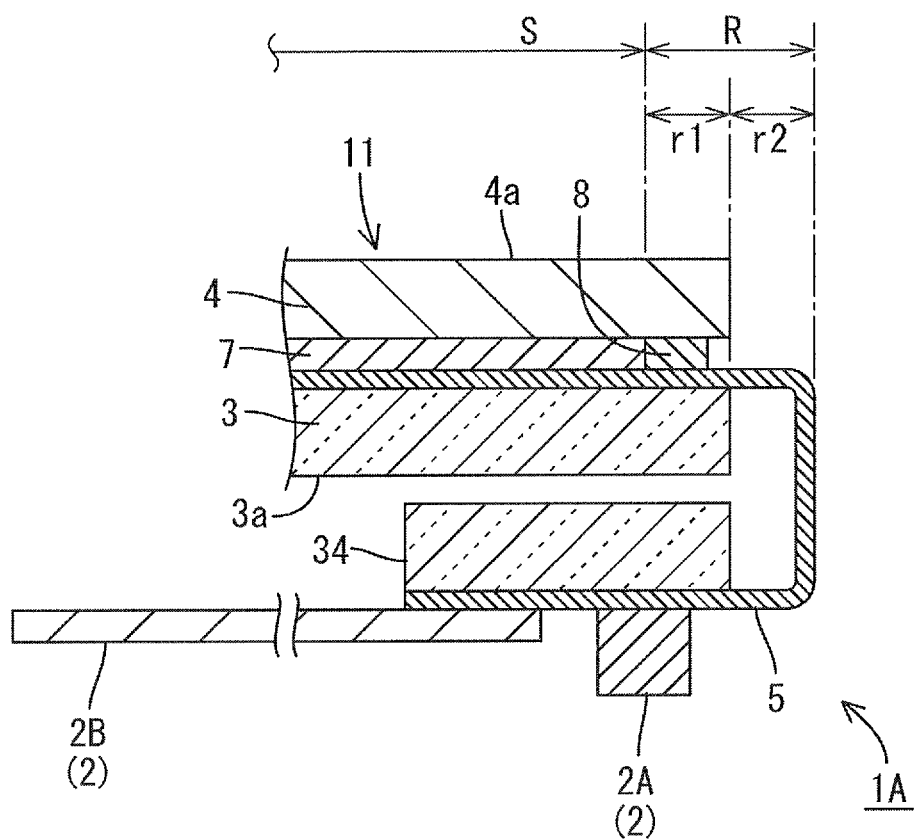
FIG. 14 is a cross sectional view typically illustrating a structure of an end portion of the liquid crystal module according to the second embodiment.

FIG. 14 is a cross-sectional view typically illustrating a configuration of a part of the liquid crystal module 1A of the second embodiment. The liquid crystal module 1A illustrated in FIG. 14 is obtained with the method of manufacturing the liquid crystal module 1A of this embodiment. In the liquid crystal module 1A illustrated in FIG. 14, the base film 5 is bent (folded) to the outer surface 3a side of the TFT array board 3 together with the reinforcing member 34. A size of the space 35 (that is a size of the portion to be removed 32) is determined such that the base film 5 is folded to the outer surface 3a side of the TFT array board 3.

In the liquid crystal module 1A of this embodiment, the frame area R is reduced similar to the first embodiment. The circuit members 2 such as the IC chip 2A mounted on the base film 5 are fixed onto the reinforcing member 34 with a part of the base film 5 and this stably maintains the electrical connection between the circuit members 2 and the wiring pattern 6.

The liquid crystal module 1A of this embodiment may be manufactured with a following method other than the above-described method. Specifically, a liquid crystal module precursor on which the circuit members 2 (the IC chip 2A and the FPC 2B) are not mounted is prepared, and the light is irradiated only to the portion to be removed 32 of the liquid crystal module precursor and the portion to be removed 32 is removed from the original board 30. Namely, before the circuit members 2 are mounted on the base film 5, the portion to be removed 32 may be previously removed from the original board 30. Thereafter, the circuit members 2 may be mounted on the liquid crystal module precursor from which the portion to be removed 32 is removed to manufacture the liquid crystal module 1A of this embodiment. For example, a plurality of liquid crystal modules 1A are combined to manufacture a large panel, and the liquid crystal modules are connected regularly with being aligned. Therefore, the portions to be removed 32 can be removed at once. This improves productivity of the liquid crystal modules 1A compared to the case in which the portion to be removed 32 is removed from each of the separated liquid crystal module precursors.

Third Embodiment

Figure 15:
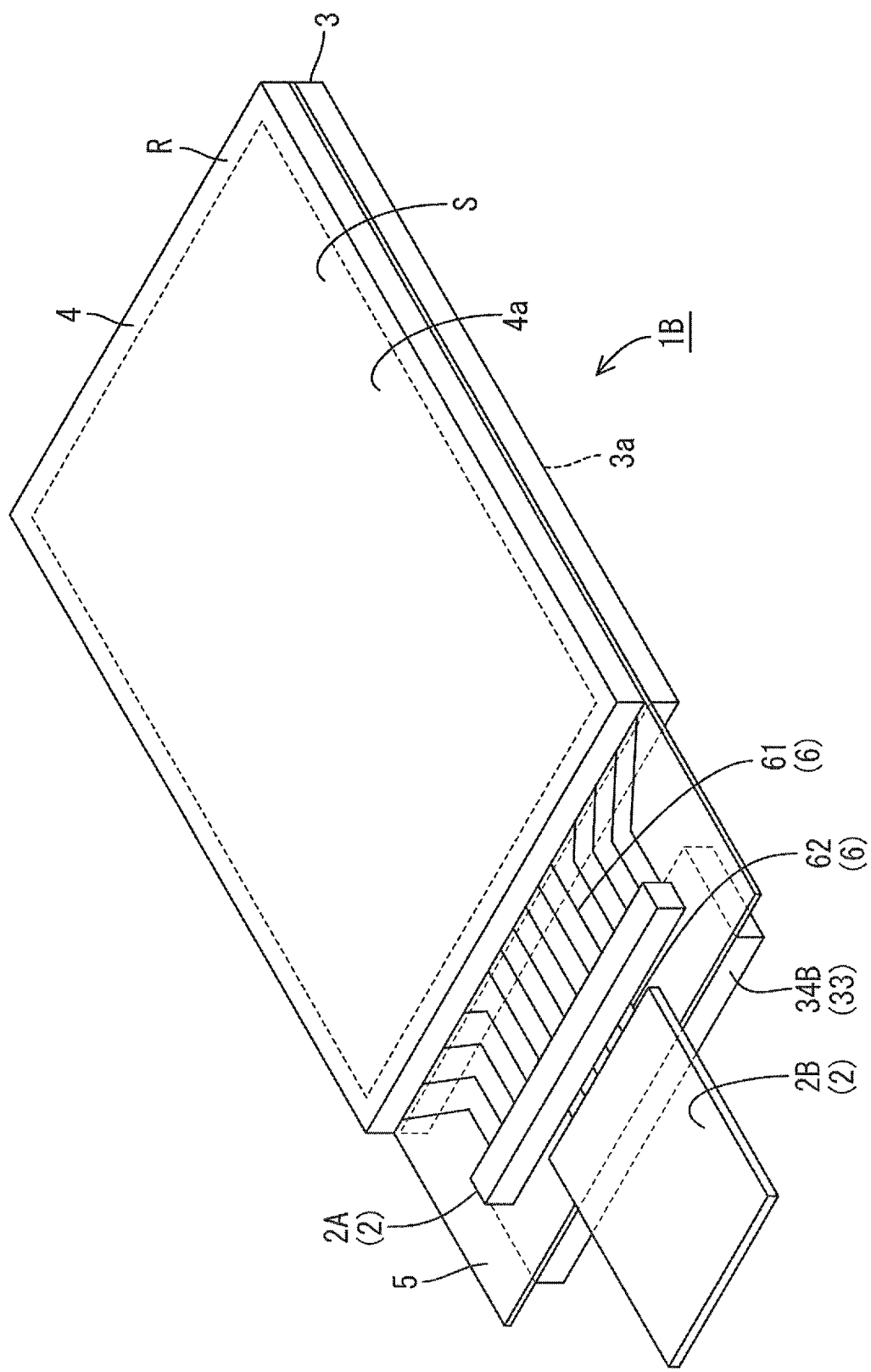
FIG. 15 is a perspective view illustrating a liquid crystal module according to a third embodiment.
Figure 16:
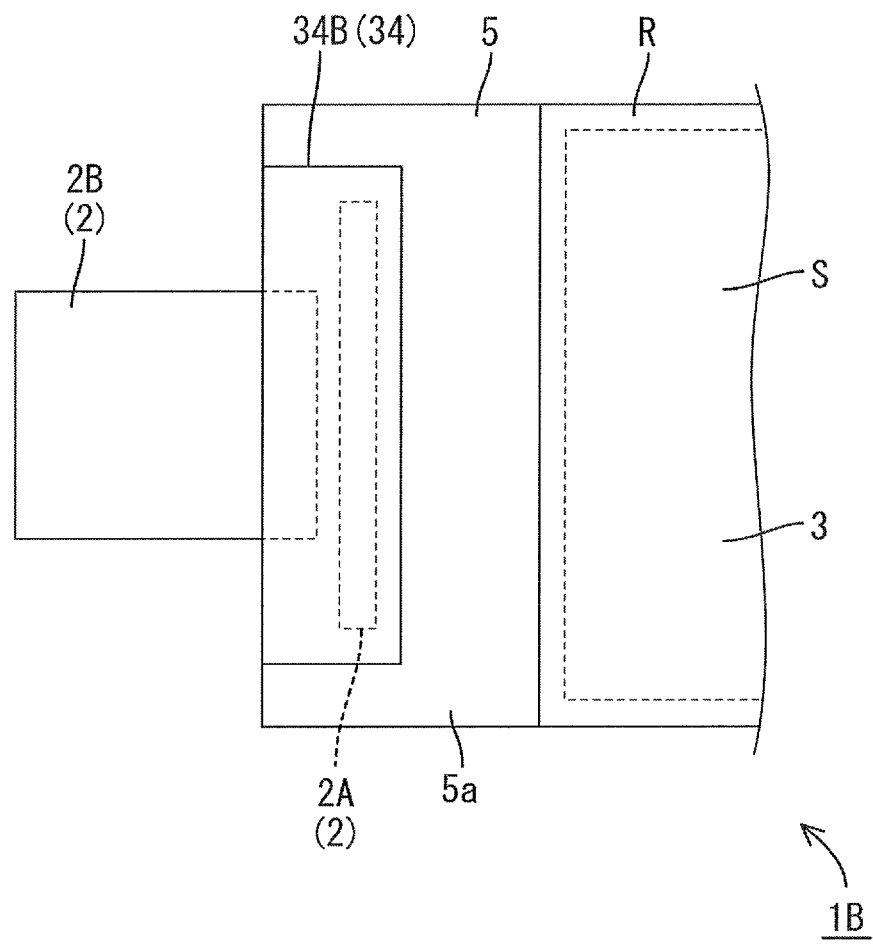
FIG. 16 is a plan view illustrating a part of the liquid crystal module according to the third embodiment seen from a TFT array board side.

Next, a third embodiment of the present invention will be explained with reference to FIGS. 15 and 16. FIG. 15 is a perspective view illustrating a liquid crystal module 1B of the third embodiment. FIG. 16 is a plan view illustrating a part of the liquid crystal module 1B of the third embodiment seen from the TFT array board 3 side. A basic configuration of the liquid crystal module 1B of this embodiment is similar to that of the first embodiment and is manufactured by processing the liquid crystal module precursor 100 (see FIG. 4). The liquid crystal module 1B includes a reinforcing member 34B similar to the second embodiment. However, the reinforcing member 34B included in the liquid crystal module 1B of this embodiment is different in its shape from that of the second embodiment.

Similar to the second embodiment, the reinforcing member 34B reinforces the portion of the base film 5 on which the circuit members 2 are mounted from the rear surface 5a side. The size of the reinforcing member 34B is smaller than that of the second embodiment. As illustrated in FIG. 16, a size of the reinforcing member 34B is smaller than a width of the base film 5 in its short-side direction. The reinforcing member 34B(34) may not be limited as long as it covers at least the rear-surface side portion of the base film 5 on which the circuit members 2 are mounted. The reinforcing member 34B(34) may not be limited but may be appropriately modified in its size or shape (a plan shape) as long as it does not obstruct bending or folding of the base film 5. To obtain the reinforcing member 34B(34) having such a shape, a light irradiation area (an area of the portion to be removed) in the separation step and an area of the original board 30 that is removed in the removing step may be appropriately adjusted.

If a size of the reinforcing member 34B (34) is reduced, the portion of the base film 5 on which the circuit members 2 are mounted is less likely to receive an external stress. Therefore, it is effective that the size of the reinforcing member 34B(34) is reduced as much as possible such that the circuit member 2 mount portion is less likely to receive the external stress.

Fourth Embodiment

Figure 17:
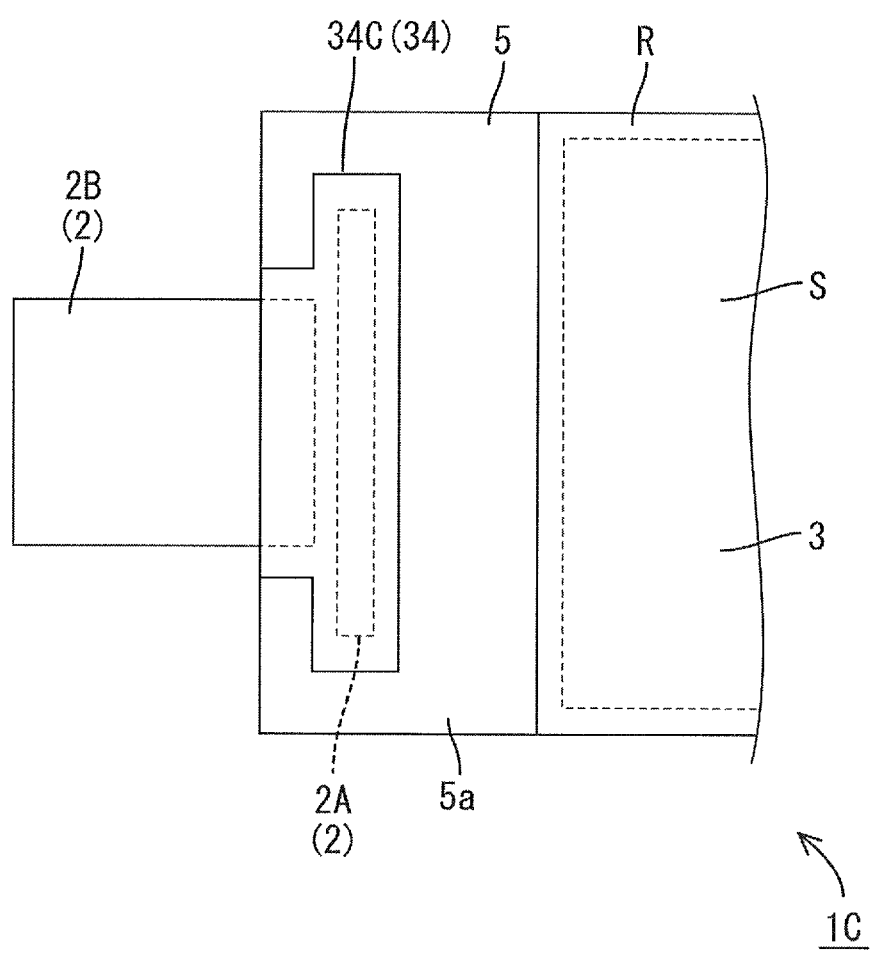
FIG. 17 is a plan view illustrating a part of the liquid crystal module according to a fourth embodiment seen from a TFT array board side.

Next, a fourth embodiment of the present invention will be explained with reference to FIG. 17. FIG. 17 is a plan view illustrating a part of a liquid crystal module 1C of the fourth embodiment seen from the TFT array board 3 side. The liquid crystal module 1C of this embodiment include a reinforcing member 34C similar to the third embodiment. However, the reinforcing member 34C has an outer appearance shape (a plan shape) following an outer appearance shape (a plan shape) of a portion of the base film 5 on which the circuit members 2 (2A, 2B) are mounted. The reinforcing member 34C reinforces the portion of the base film 5 on which the IC chip 2A is mounted and the portion of the base film 5 on which the FBC 2B is mounted. Thus, the reinforcing member 34C has a shape following the shape of each circuit member 2 mount portion, and this reduces the size of the reinforcing member 34C. Therefore, according to the liquid crystal module 1C of this embodiment, the mount portion is less likely to receive the external stress compared to the above embodiments.

Fifth Embodiment

Figure 18:
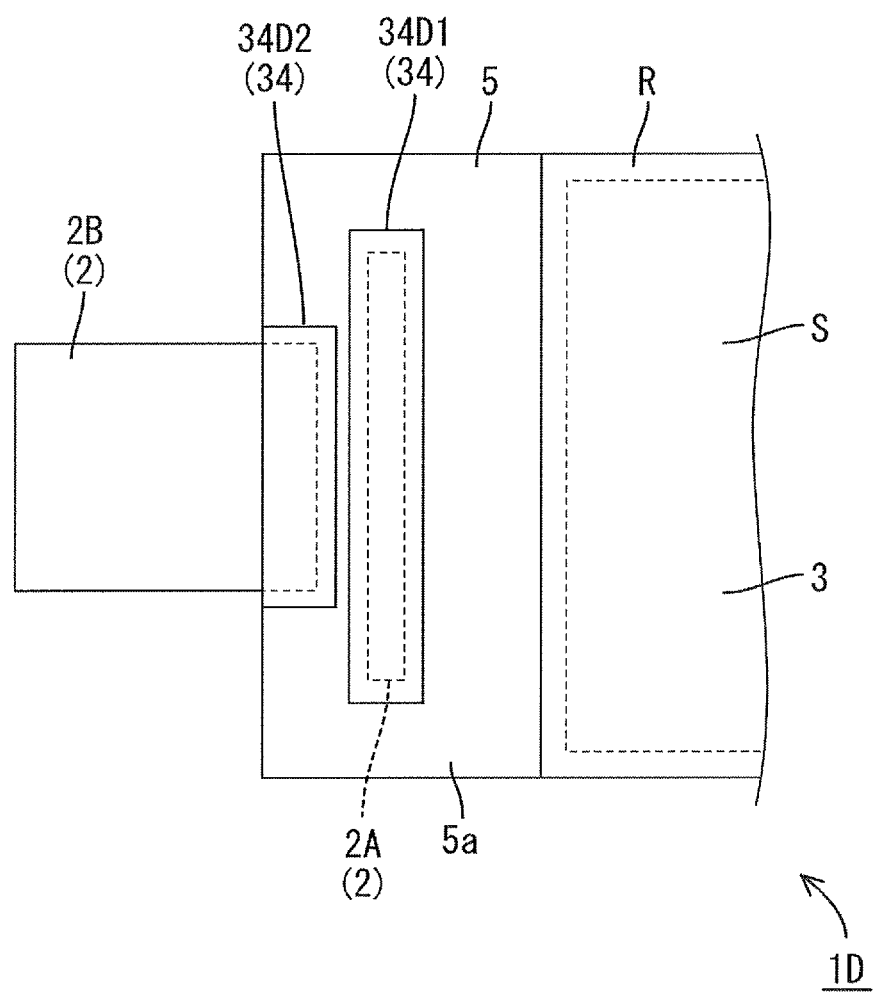
FIG. 18 is a plan view illustrating a part of the liquid crystal module according to a fifth embodiment seen from a TFT array board side.

Next, a fifth embodiment of the present invention will be explained with reference to FIG. 18. FIG. 18 is a plan view illustrating a part of a liquid crystal module 1D of the fifth embodiment. Similar to the fourth embodiment, the liquid crystal module 1D includes reinforcing members 34D1, 34D2 each following a shape of a mount portion of each circuit member 2. However, each of the reinforcing members 34D1, 34D2 is arranged for each circuit member 2 to reinforce the corresponding circuit member 2. Namely, the reinforcing member 34D1 and the reinforcing member 34D2 are separately arranged, and the reinforcing member 34D1 reinforces the mount portion of the IC chip 2A and the reinforcing member 34D2 reinforces the mount portion of the FPC 2B. Thus, each of the reinforcing members 34D1, 34D2 is arranged for each circuit member 2. Accordingly, the mount portions of the base film on which the circuit members 2 are mounted are reinforced with keeping flexibility of portions of the base film 5 other than the mount portions of the circuit members 2. The reinforcing member 34D1 has the outer appearance shape (a plan shape) following the outer appearance shape of the mount portion of the IC chip 2A and the reinforcing member 34D2 has the outer appearance shape (a plan shape) following the outer appearance shape of the mount portion of the FPC 2B. Therefore, according to this embodiment, the mount portion of each circuit member 2 (2A, 2B) is less likely to receive the external stress.

Sixth Embodiment

Figure 19:
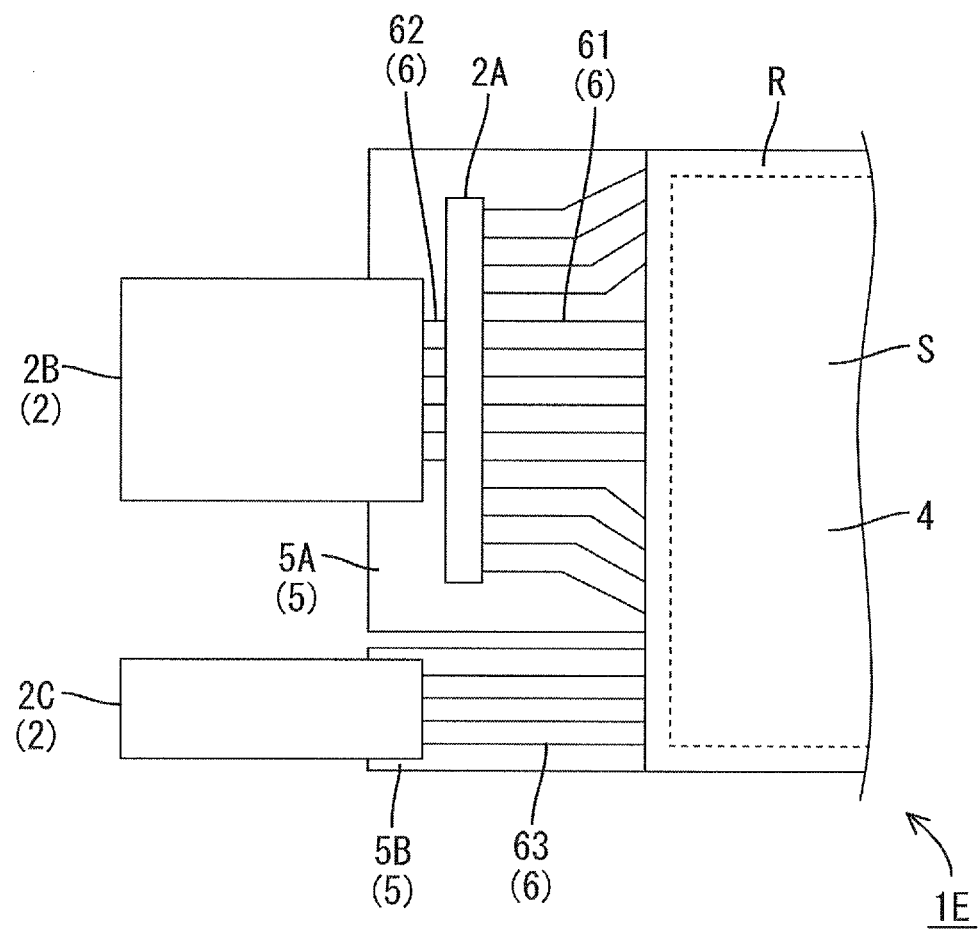
FIG. 19 is a plan view illustrating a part of the liquid crystal module according to a sixth embodiment seen from a CF board side.
Figure 20:
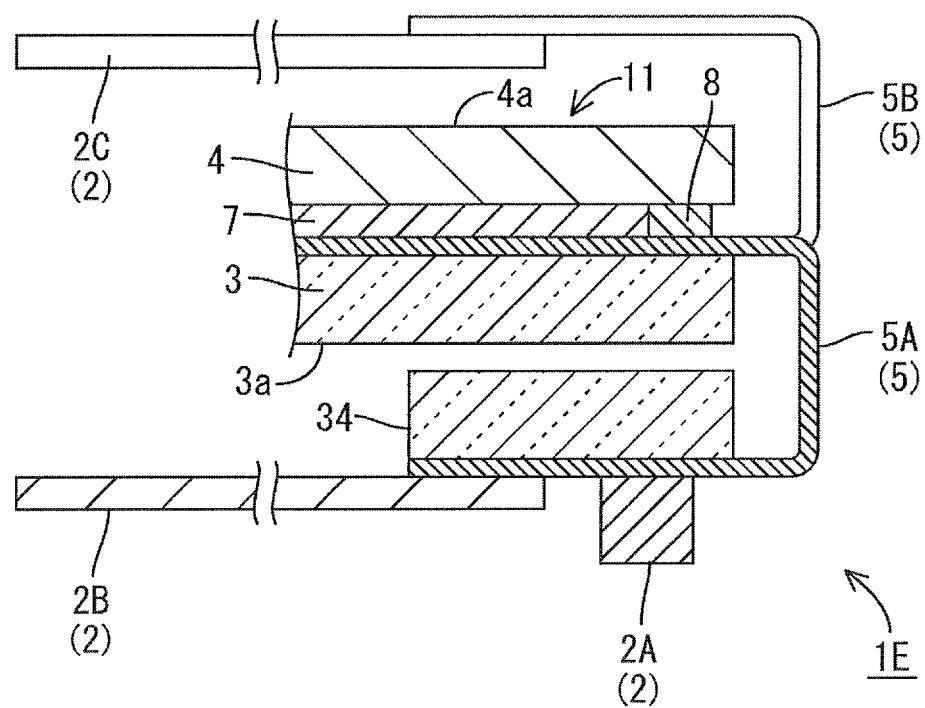
FIG. 20 is a cross sectional view typically illustrating a structure of an end portion of the liquid crystal module according to the sixth embodiment.

Next, a sixth embodiment of the present invention will be explained with reference to FIGS. 19 and 20. FIG. 19 is a plan view illustrating a part of a liquid crystal module 1E of the sixth embodiment seen from the CF board 4 side. FIG. 20 is a cross-sectional view typically illustrating a configuration of an end part of the liquid crystal module 1E of the sixth embodiment. The liquid crystal module 1E of this embodiment has a basic configuration same as the one of the first embodiment. In the liquid crystal module 1E of this embodiment, a portion of the base film 5 that extends outwardly from the liquid crystal panel 11 is branched into two. The wiring pattern 6 (61, 62) is formed on one base film 5A of the two-branched base film portions, and the wiring pattern 6 (63) is formed on another base film 5B. The IC chip 2A and the FPC 2B are mounted in certain positions on the base film 5A and another FPC is mounted on the base film 5B.

As illustrated in FIG. 20, the base film 5A is bent (folded) to the outer surface 3a side of the TFT array board 3. The base film 5B is bent (folded) to the outer surface 4a side of the CF board 4. Namely, the base films 5A, 5B are bent in different directions.

Like the liquid crystal module 1E of this embodiment, a plurality of base films 5 (5A, 5B) may be provided. In another embodiment, the portion of the base film 5 extending outwardly may be branched into three or more. Like the base film 5B, the branched portions may be bent to the outer surface 4a side of the CF board 4.

The liquid crystal module 1E of this embodiment may be used in a display device including the liquid crystal panel 11 and another panel. For example, the other panels include a touch panel, a parallax barrier panel or other panels. In such a configuration, the base film 5B that is bent to the outer surface 4a side of the CF board 4 may be connected to one of the other panels. The circuit member 2 that is mounted on each base film 5 may be set according to a usage of the liquid crystal module 1E. The reinforcing member 34 arranged on the base film 5 may not be provided in another embodiment.

The base film 5 whose end portion is branched into two ore more may be prepared by cutting an organic film into two or more branches each having a certain shape after the removing step or by cutting the organic film on the original board 30 before the separation step.

Seventh Embodiment

Figure 21:
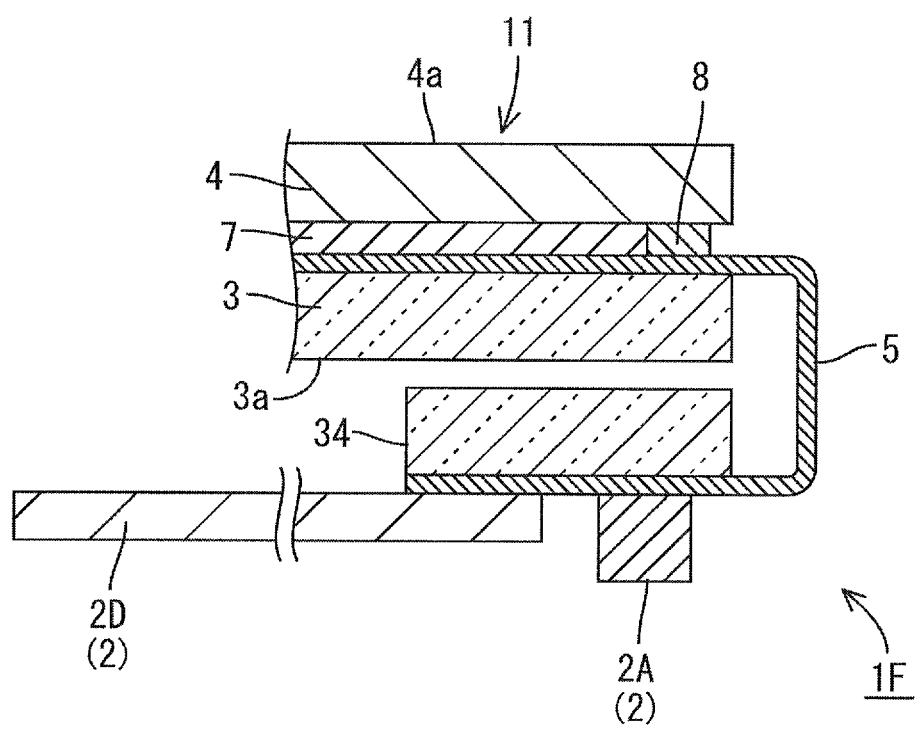
FIG. 21 is a cross sectional view typically illustrating a structure of an end portion of a liquid crystal module according to a seventh embodiment.

Next, a seventh embodiment of the present invention will be explained with reference to FIG. 21. FIG. 21 is a cross-sectional view typically illustrating a configuration of an end part of a liquid crystal module 1F of the seventh embodiment. The liquid crystal module 1F of this embodiment includes a printed wiring board 2D as the circuit member 2 that is mounted on the base film 5. Not only the FPC 2A but also the printed wiring board 2D may be mounted on the base film 5 as the circuit member 2.

Eighth Embodiment

Figure 22:
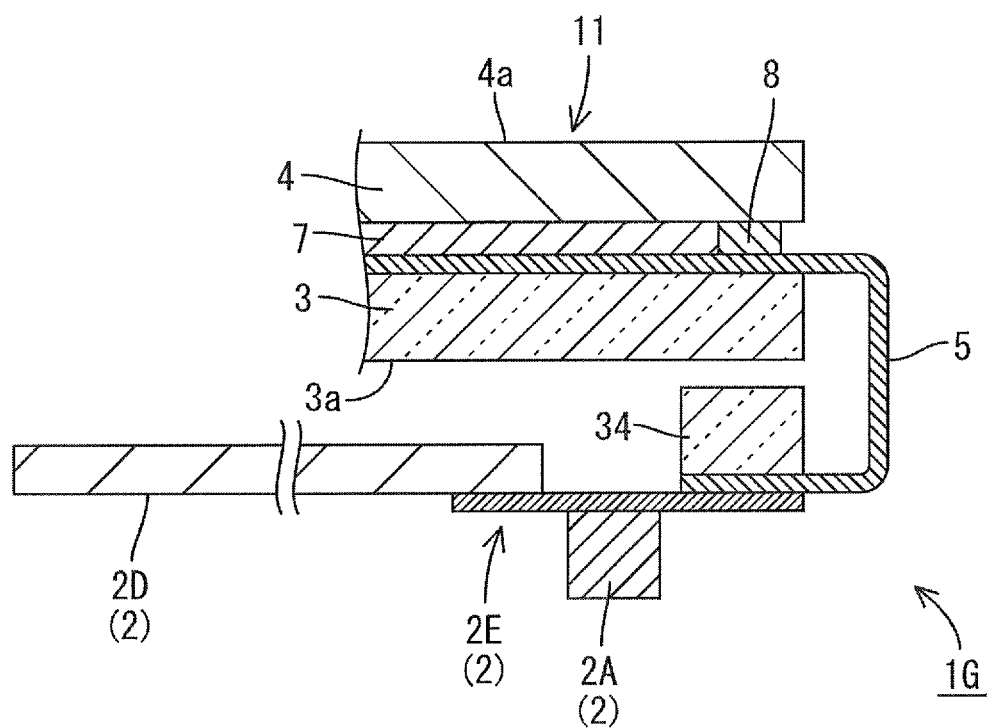
FIG. 22 is a cross sectional view typically illustrating a structure of an end portion of a liquid crystal module according to an eighth embodiment.

Next, a seventh embodiment of the present invention will be explained with reference to FIG. 22. FIG. 22 is a cross-sectional view typically illustrating a configuration of an end part of a liquid crystal module 1G of the eighth embodiment. The liquid crystal module 1G of this embodiment includes an SOF 2E provided with the IC chip 2A as the circuit member 2 that is mounted on the base film 5. The SOF 2E is connected to the printed circuit board 2D. Thus, the IC chip 2A is not necessarily mounted directly on the base film 5 but may be mounted as the SOF 2E.

Other Embodiments

The present invention is not limited to the above embodiments described in the above description and the drawings.

The following embodiments are also included in the technical scope of the present invention, for example.

(1) In the above embodiments, the IC chip, the FPC, the printed circuit board, the SOF are used as the circuit members 2. However, in other embodiments, a condenser or a resistance may be mounted as the circuit member 2, for example.

(2) In the above embodiments, the base film 5 is configured to cover substantially an entire area of the display area S. However, in other embodiments, for example, the base film 5 may be configured such that the sealing member 8 is not formed on a part or an entire area of the display area S.

(3) In the above embodiments, the reinforcing member 34 is formed by remaining a part of the original board 30 on the base film 5. However, in other embodiments, for example, a member may be provided separately from the original board 30 as the reinforcing member and the separate member may be arranged in a certain position of the base film as an external member. From a view point of productivity of the liquid crystal module 1, it is effective to use a part of the original board 30 to form the reinforcing member like the above embodiments.

(4) In the above embodiments, a border at which the portion to be removed 32 is separated from the original board 30 is set substantially at an end position of the CF board 4. However, in other embodiments, the border may be set closer to the sealing member 8 from the end of the CF board 4. If the sealing member 32 has a sufficient width to sufficiently ensure a good sealing property (sealing performance) of sealing the liquid crystal layer 8, the border may be set so as to pass over the sealing member 8.

(5) In the above embodiments, in the separation step, the laser light is irradiated to the base film 5 that is formed on the portion to be removed 32 and the base film 5 is separated from the portion to be removed 32. However, in other embodiments, for example, the base film 5 formed on the portion to be removed 32 is heated selectively by a heater or the like, and the heated portion of the base film 5 may be separated from the portion to be removed 32.

(6) In the above embodiments, the liquid crystal module is used as the display module. However, in other embodiments, for example, other display module may be used. For example, an organic EL module including an organic EL panel on which circuit members such as an IC chip are mounted may be used as the display module.

EXPLANATION OF SYMBOLS

1: liquid crystal module (Display module),
2: Circuit member,
3: TFT array board (First board),
3a: Outer surface of TFT array board,
4: CF board (Second board),
4a: Outer surface of CF board,
5: Base film,
6: Wiring pattern,
7: Liquid crystal layer,
8: Sealing member,
10: Liquid crystal display device, (display device),
11: Liquid crystal panel,
S: Display area:
R: Frame area

The invention claimed is:

1. A method of manufacturing a liquid crystal module comprising steps of:
   preparing a first board;
   forming an insulating base film on a surface of the first board;
   preparing a second board having a size smaller than the first board;
   bonding the first board and the second board such that an end of the first board extends outwardly from an end of the second board;
   forming a circuit member on a portion of the base film corresponding to a portion of the first board that is located outside of the second board;
   irradiating light to the portion of the base film corresponding to the portion of the first board that is located outside of the second board;
   separating the portion of the base film irradiated with light in the irradiating step; and
   removing the portion of the first board corresponding to the portion of the base film that is separated in the separating step.

2. The method according to claim 1, further comprising bending the portion of the base film that is located outside of the second board toward an outer surface side of one of the first board and the second board, after the removing step.

3. The method according to claim 2, wherein after the bending step, the circuit member is located on an outer surface side of the base film.

4. The method according to claim 1, wherein
   in the irradiating step, the irradiating of the light to the portion of the base film excludes irradiating the light to an end portion of the base film that is located outside of the second board, and
   the method further comprising:
   forming a reinforcing member that is configured with the end portion of the base film and a portion of the first board corresponding to the end portion, the reinforcing member reinforcing the portion of the base film on which the circuit member is formed in the forming step.

5. the method according to claim 4, wherein in the forming step, the reinforcing member is formed so as to have a plan shape following a plan shape of the portion of the base film on which the circuit member is mounted.

6. The method according to claim 4, wherein the reinforcing member is formed of a same material as the first board.

* * * * *